(12) United States Patent
Curley et al.

(10) Patent No.: US 7,937,470 B2
(45) Date of Patent: May 3, 2011

(54) METHODS OF DETERMINING COMMUNICATIONS PROTOCOL LATENCY

(75) Inventors: Robert Curley, Seattle, WA (US); Eli Patashnik, Bothell, WA (US)

(73) Assignee: Oracle International Corp., Redwood Shores, CA (US)

( * ) Notice: Subject to any disclaimer, the term of this patent is extended or adjusted under 35 U.S.C. 154(b) by 3383 days.

(21) Appl. No.: 09/740,804

(22) Filed: Dec. 21, 2000

(65) Prior Publication Data

US 2002/0120727 A1     Aug. 29, 2002

(51) Int. Cl.
*G06F 15/173* (2006.01)
(52) U.S. Cl. ... 709/226; 709/203; 709/224; 370/395.52; 370/241
(58) Field of Classification Search .................. 709/223, 709/226, 224, 206, 203; 370/241, 395.52
See application file for complete search history.

(56) References Cited

U.S. PATENT DOCUMENTS

| | | | |
|---|---|---|---|
| 4,789,948 A | 12/1988 | von der Embse | |
| 4,918,623 A | 4/1990 | Lockitt et al. | |
| 5,095,444 A | 3/1992 | Motles | |
| 5,732,218 A | 3/1998 | Bland et al. | |
| 5,781,703 A | 7/1998 | Desai et al. | |
| 5,787,253 A | 7/1998 | McCreery et al. | |
| 5,870,561 A * | 2/1999 | Jarvis et al. | 709/238 |
| 6,006,260 A | 12/1999 | Barrick, Jr. et al. | |
| 6,012,096 A * | 1/2000 | Link et al. | 709/233 |
| 6,014,381 A * | 1/2000 | Troxel et al. | 370/395.52 |
| 6,018,516 A | 1/2000 | Packer | |
| 6,035,418 A | 3/2000 | Recio et al. | |
| 6,046,980 A | 4/2000 | Packer | |
| 6,047,322 A | 4/2000 | Vaid et al. | |
| 6,078,953 A * | 6/2000 | Vaid et al. | 709/223 |
| 6,078,957 A | 6/2000 | Adelman et al. | |
| 6,138,157 A | 10/2000 | Welter et al. | 709/224 |
| 6,330,602 B1 * | 12/2001 | Law et al. | 709/224 |
| 6,449,647 B1 * | 9/2002 | Colby et al. | 709/226 |
| 6,449,739 B1 | 9/2002 | Landan | |
| 6,560,648 B1 * | 5/2003 | Dunn et al. | 709/224 |
| 6,662,223 B1 * | 12/2003 | Zhang et al. | 709/224 |
| 6,789,050 B1 * | 9/2004 | Reeser et al. | 703/2 |
| 2002/0105911 A1 * | 8/2002 | Pruthi et al. | 370/241 |
| 2003/0115266 A1 * | 6/2003 | Sweet et al. | 709/203 |

OTHER PUBLICATIONS

Zona Research Inc., *Internet Business Review*, "Keynote Systems," Aug. 2000.
Web site information, HTTP://www.keynote.com/index.
Web site information, Keynote Systems—Worldwide Measurement Network, "Assuring Peak Web-Site Performance and Quality of Service with Keynote Services".
Keynote The Internet Performance Authority, "Assuring Peak Web-Site Performance and Quality of Service".
Keynote The Internet Performance Authority, "Getting Started with Keynote Services," Rev. Nov. 7, 2000.

(Continued)

*Primary Examiner* — Tammy T Nguyen

(57) ABSTRACT

A remote network monitor for monitoring transaction-based protocols such as HTTP receives and analyzes protocol requests and associated responses, and derives therefrom a parameter associated with round-trip network latency. For example, TCP/IP acknowledgement packets can be used to deduce network latency. Such network latency and total latency parameters can be used to determine which portion of total latency can be attributable to the network and which portion is attributable to node processing time (e.g., server and/or client processing). A plurality of remotely located network monitors (and/or monitors co-located with servers and/or clients) can be used to derive and report on actual latency experienced throughout the network.

29 Claims, 11 Drawing Sheets

OTHER PUBLICATIONS

Keynote Systems, Inc. "Understanding Web Site Speed and Reliability," Jun. 5, 2000.
White Paper, "Keynote, Using Keynote Measurements to Evaluate Content Delivery Networks," Apr. 26, 2000.
Keynote Systems, Inc., "Keynote Systems Data Accuracy and Statistical Methodology,".
White Paper by Zona Research, Inc., "The Economic Impacts of Unacceptable Web-Site Download Speeds," Apr. 1999.
Keynote Systems, Inc. "Measuring and Improving Your E-Commerce Web-Site Performance with Keynote Perspective™," Nov. 27, 2000.
Keynote Systems Annual Report 1999.
Keynote Systems, Inc. "The Interaction of Web Content and Internet Backbone Performance," Nov. 27, 2000.
Siegel, Eric D., *Networld+Interop 2000*, Sep. 26, 2000.
Zona Research Inc., *Zona Market Report*, "Web Robustness Measurement: The Future May Be Now" Issue 37, Aug. 2000.
Zona Research Inc., *Zona Market Report*, "Inside, Outside or Upside Down" Issue 38, Aug. 2000.
Web site information, HTTP://appliant.com.
Page, Bob, Accrue Software, Inc. "Using Network Analysis to Improve Visitor Response at a Web Site," Jun. 6, 1999.
The University of Waikato, HTTP://www.waikato.ac.nz/harvest/uniforum98/.
Holistix Remote Monitor, "Know that your site is performing for your customers," "Holistix Web Manager Reviewer's Guide".
Padmanabhan, Venkata N., et al., "Improving HTTP Latency".
"Appliant Technology" (2001) (www.appliant.com/technology/technology.asp).

* cited by examiner

Example Connect Time Metric 'Bucket' Breakdown

| 0ms - 500ms | 500ms - 1 second | 1 second - 3 seconds | 4 seconds or higher |
|---|---|---|---|
| 7840 | 529 | 9 | 1 |

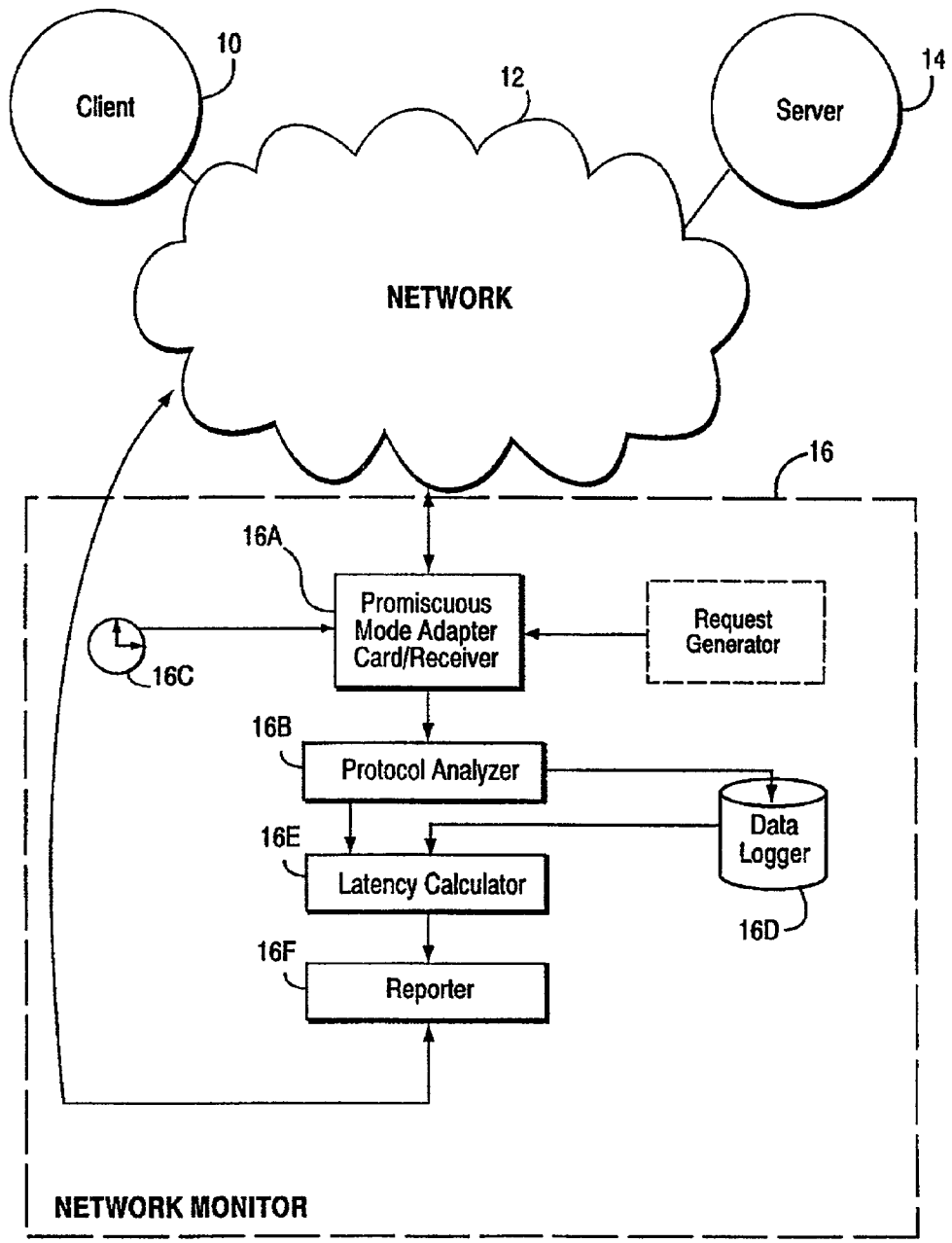
Fig. 9 Example Network Monitor Architecture

METHODS OF DETERMINING COMMUNICATIONS PROTOCOL LATENCY

FIELD OF THE INVENTION

The invention relates to data communications monitoring and analysis, and more particularly to techniques for analyzing the performance of network servers and WAN networks. In still more detail, the invention relates to techniques for measuring network latency using transaction-based protocols such as HTTP.

BACKGROUND AND SUMMARY OF THE INVENTION

The World Wide Web has emerged as an important if not essential part of modern everyday life for many individuals and business throughout the world. We can now use the World Wide Web to obtain information, perform transactions such as shopping and procurement, exchange information with one another, and for a wide variety of other uses and applications.

Much work has gone into keeping the World Wide Web and the underlying networks (e.g., the Internet) on which it is based operating smoothly and reliably. Back when the Internet was in its infancy, the academics and computer scientists who were its primary users tolerated slow response times and slow download speeds. Now, with the proliferation of users who are less technically inclined and who desire an efficient and more satisfying web browsing experience, such delays are no longer acceptable. For example, a study by Zona Research estimated that online companies could lose more than $4.3 billion in revenues each year due to customer frustration over poor Web site performance.

Some delay is inherent in the fabric of the Internet. The Internet (at least in its current form) is a decentralized network that lacks sophisticated universally-accepted guaranteed timely delivery infrastructure. Congestion, equipment failures and other factors can therefore at times dramatically slow down data transmission on the Internet. Such factors are generally out of the control of both clients and servers and therefore must be tolerated.

The existence of such Internet speed performance degradation places a premium on fast server response time. Generally, people operating servers want their servers to respond to incoming requests as rapidly and efficiently as possible (and the same can be said for people operating clients). Because response latency (i.e., time delay between when a client makes a request and the time the client receives the requested information) can depend on a number of complex factors only some of which may relate to server performance and others of which relate to general network latency, it may be desirable to analyze the different factors involved in the latency of a particular request to determine the principle causes.

For example, suppose a large e-commerce-based organization operating an important web site receives complaints from customers or prospective customers that requested web pages are not coming up quickly on users' browsers. Or suppose such a site experiences a decrease in sales volume because impatient users choose to not wait around for slow page delivery. Such a server operator is extremely motivated to try to figure out what is causing the slow-downs. It would be valuable, for example, for the server operator to know whether the slowdowns were being caused by its own server equipment as opposed to inherent network delays—since such equipment-based bottlenecks might be relatively easily cured through equipment redesign or tuning. With e-business, you need to know how customer experience is being affected—at all times, around the world. Because of the many factors affecting the overall performance of the Internet—backbone congestion, host provider performance, web site design, and end-user connectivity—e-businesses lack critical information affecting web site performance. Without independent knowledge of user experience, diagnosing problems is difficult, and solutions are a challenge to implement.

One way to approach this problem is to install and operate performance tools on the server itself. A number of such tools are available. These tools work by monitoring incoming requests and outgoing responses and/or the various processes used to handle them. While this approach works well and provides a lot of useful information, it has the limitation that the server infrastructure must be modified by installing performance analyzing software. Also, such locally installed tools cannot measure or account for off-site network delays. There are some situations in which it would also be desirable to remotely collect server performance information without any modification to the server (e.g., to avoid the need to install additional equipment at or near the server being monitored) and/or which would measure actual overall performance as seen from the perspective of a client operating somewhere (anywhere) on the network. As one example, a business model centering around offering third party server performance monitoring services would have a distinct advantage if the performance monitoring to be done remotely (e.g., over the Internet) without the need to disturb or otherwise modify the server being monitored and which could measure and report on actually prevailing network conditions. In other situations, local monitoring is desirable but more accurate monitoring of additional parameters would be highly desirable.

The present invention offers a solution to this problem by providing a monitoring capability for transaction-based protocols based on round-trip network latency time.

One aspect of remote monitor subscription-based service provided by the invention employs a network of monitors on Internet backbones around the world to simulate visits to any Web site and to report performance results. The service allows Web managers to test the performance ("health") of their Web sites from a visitor's perspective by monitoring the availability and response times for URLs, customer transactions, external content providers and more. The new service goes beyond simple monitoring of a Web site. It allows Web managers to quickly detect, respond to and prevent Web site performance problems related to Internet congestion, ISP service level, external content provider performance, overall Web site design and internal Web site component failure.

Such a remote monitor service package may use independent servers strategically placed around the world to determine how a Web site is performing and to simulate a visitor's experience at any given moment. By sending and or monitoring server requests to a Web site from multiple locations, this service allows Web managers to react to problems before their customers experience any dissatisfaction, yet creates only a negligible (or no) load on their Web infrastructure. Because it is a hosted service, Web managers can sign up and begin monitoring their site almost immediately without installation or maintenance headaches.

Web managers can keep a vigilant watch on critical site performance metrics such as the time it takes to serve Web pages and the success of visitors' transactions on the site, for example form submissions, searches and purchases. They can also monitor their service level agreements with external services, such as credit card approval, advertising or news. Using such remote monitoring capability, Web managers can compare their site's availability to their competitors' and check performance from key servers around the world to determine where geographic bottlenecks may be occurring.

An example network monitoring system provided by a preferred embodiment of the invention detects, responds to and prevents performance problems. For example, a monitor may be used to deliver actionable information to help Web managers detect, respond to and prevent Web site performance problems. Using such a monitor, Web managers set acceptable thresholds for the performance of desired Web site activities. If a "trigger level" for performance is exceeded, a message alert is sent to their pager, cell phone or e-mail. For example, a message could be sent when a Web page takes more than 6 seconds to load or a transaction fails to complete. This quick response makes it possible to take corrective action before a situation turns critical.

Once the network provider service identifies a problem, Web managers can respond quickly. The alerts from the remote monitor can include information to help pinpoint the source of the problem. Web managers can also log on to their account from any Web browser to troubleshoot a problem using a web-enabled console and easily drill down to the detail level of the problem, as well as review extensive online reports.

While real-time monitoring and immediate problem solving are useful, it is equally important to review historical trends to identify system weak spots so Web managers can design better networks or redesign their Web systems to improve future performance. Network monitor can provide numerous reports, which allow the Web manager to analyze whether performance problems are occurring outside the firewall, and if so, devise solutions. Those might include, e.g., working with an ISP to achieve better backbone peering or setting up distributed caching solutions.

Subscription Packages and Pricing Subscription packages for remote monitor can be designed to be flexible so that Web managers can monitor one URL or monitor their entire e-business. Service packages can include monitoring site availability, response time and/or transactions with data gathered from a single remote location or multiple locations worldwide. A basic subscription might, for example, measure availability and response time for five URLs from one location every 30 minutes. A more comprehensive subscription package could include a number of monitors measuring transaction performance from various monitoring locations throughout the world as often as every five minutes.

How does such monitoring work? As is well known, in transaction-based protocols such as HTTP, clients make requests that a server replies to with one or more data packets. While the entire HTTP transaction is in progress, we are able to measure various network transport (TCP) exchanges including the "round-trip network latency" time incurred for the TCP session. Calculating and then separating "round-trip network latency" time for transaction-based protocols such as HTTP allows us to determine how and where HTTP transaction time is being spent. When overall web page response times are slow, this separation gives a web master, for example, insight to help pinpoint the problem so that better performance can be delivered to web clients.

An aspect provided by the invention separates the initial web server reply from all subsequent HTTP replies to a given client's HTTP transaction request. Through this separation, we are able to make an initial distinction between time spent by a web server application and the subsequent time delivering the web content by the network transport (TCP). By making this distinction and then using gathered network transport (TCP) measurements such as round-trip network latency, it is possible to neatly break down the entire HTTP transaction into meaningful categories for someone such as a web master to understand. Such categories can include, for example:

web server processing time,
network transport time,
client processing time.

One way to monitor such parameters is to connect a network adapter card onto the network the server and client are operating upon and placing the network adapter card into promiscuous mode. Such a network adapter card operating in promiscuous mode can be used to monitor transaction-based protocol traffic remotely and break down response time into various components. Transaction-based protocols generally employ a client that sends out requests, working with a server that services those requests by providing a reply that can span one or more data packets. There can be many requests between the client and the server over the life of a particular session. When we monitor these requests, we are able to get detailed information about how time is spent on the network while the transaction completes.

In a transaction-based protocol like HTTP, when the web server replies with multiple HTTP data packets to the client, the time spent from the first HTTP reply until the final HTTP data packet is time that is attributable to the network transport (TCP) protocol. We assume web page content that is to be shipped to the client is first gathered before the initial HTTP reply is sent such that negligible application server time is spent during this interval. Thus, associated delays would be assumed to be attributable to network transport time as opposed to processing time on the server itself. Knowing the value for network transport time is beneficial to a web master or network administrator. For example, a large value for a web page of small or modest size may indicate that there are network problems that may need to be addressed in order to speed delivery of web content.

In one example detailed implementation, we obtain parameters indicative of network transport time through the following techniques:

use of the web server's initial HTTP reply packet as the logical dividing line for the web client to web server HTTP packet exchange. This allows us to distinguish the initial web server reply time from the network transport time (time spent from the first HTTP data packet until the last HTTP data packet for the transaction has arrived from the web server).

use of IP Header sequence number to help distinguish out-of-order TCP packets from retransmitted TCP data packets each carrying HTTP data use of web client/server initial exchange and TCP header flags to determine if the initial HTTP reply is retransmitted or not use of retransmission time as time to discount when calculating web server processing time use of retransmission time as time to discount when calculating TCP connect processing time The use of round-trip network latency calculations can be applied to transaction-based protocols such as HTTP. Determining the amount of network latency is beneficial because this time, although calculated as part of the total transaction time, does not represent time spent on the client or the server. When analyzing web server response time or performance, this round-trip latency can be determined and utilized.

Knowing the round-trip network latency value is beneficial to web masters and network administrators. For example, if web response time is slow, and the round-trip network latency value is high, addressing slow responsiveness requires that the problem be addressed on the network—not on the web server. Conversely, if the round-trip network latency value is low, slow response is best addressed by looking at web server performance.

In one detailed example, round-trip network latency determination may include any or all of the following features:
- continuous calculation transport-to-transport (TCP-to-TCP) network latency to obtain minimum network latency for the TCP session
- uses the round-trip acknowledgment times for TCP data
- uses the round-trip acknowledgment times for the TCP flags (SYN or FIN bits for example)
- use of TCP slow-start algorithm to obtain an additional round-trip network latency calculation
- use of client TCP changing TCP window size from zero to non-zero to gather an additional round-trip network latency calculation
- use of this round-trip network latency as time to discount when calculating web server processing time
- use of this round-trip network latency as time to discount when calculating TCP connect processing time Additional features and advantages provided in accordance with aspects of a remote monitor system and method provided by the present invention include:
- Detailed reports showing IT managers how factors such as customer location, ISP connectivity, backbone peering issues, network infrastructure and other variables are affecting site performance
- High level reports on availability and responsiveness to help business managers ensure that SLAs are being met and customer experience is positive
- Allows IT managers to focus their investments where their infrastructure needs them most. When they know exactly which parts of their network are affecting customer experience, they can allocate their resources more effectively-and avoid investing time and money where they're not really needed
- Know that a site is performing for customers
- A subscription-based service that uses a global network of servers to monitor web site performance from a user perspective and to alert web operations managers when problems occur and provide specific information for rapid problem resolution.
- Deploys in minutes to monitor
- Can measure response times, transactions, external content providers, and web site throughput
- When problems are detected, intelligent alerting routes a message to the appropriate person for immediate problem resolution. Remote monitoring agents are strategically distributed around the world to simulate the end-user's experience of a web site at any given moment. Without independent monitors located away from the infrastructure, there's no way to accurately assess how the Web site is actually performing. By monitoring the site's availability and responsiveness from outside the firewall, one can react to problems quickly—before your customer does.
- Goes beyond simply telling whether or not a web site is responding. It uses a unique in-depth process to tell why a site is not responding. For example, Remote Monitor can verify that page content is correct, retrieval time is acceptable, and back-end databases are responding properly.
- Can employ multiple servers strategically placed around the world to continually monitor the performance of a web site.
- Can send individual requests to a web site from multiple locations—with negligible additional load on site resources.
- When a problem is detected, can send alerts via e-mail, cell phone, or pager. The processed data is placed into reports that provide perspective on performance issues.
- Reports are accessible online at any time.
- Provides all the information necessary to achieve optimal web site performance. Remote Monitor doesn't flood a server operator with data from dozens of servers around the world—it isolates issues and provides specific information showing exactly what is affecting user performance:
- Monitor availability—This includes URL availability, file checking, IP throughput and HTTP response time. You'll know at all times whether a URL is available or not, and you'll find out about downtime before your customers do.
- Monitor page load time—Your site may be up, but if a page or data takes too long to load, your site might as well be down. With Remote Monitor, you get alerts immediately whenever thresholds are crossed.
- Monitor transactions—Remote Monitor can monitor specific tasks such as web-based transactions and other mission-critical functions (e.g., form submission, search, etc.).
- Receive immediate alerts—Remote Monitor can send alerts to a pager, cell phone or e-mail as soon as your defined response time thresholds are crossed.
- Monitor connectivity—With Remote Monitor in place, you can accurately assess which parts of your network are affecting user performance. You can focus on the parts of your network that are critical to performance, instead of investing time and money where its not really needed. For example, if users in Dallas experience slow response times, you may need to implement an additional data center in Texas rather than adding additional bandwidth to your data center on the West Coast.
- Monitor applications—With Remote Monitor in place, you can accurately assess which parts of your infrastructure are affecting end user experience. By monitoring certain applications and seeing results over time, you can determine which applications may be affecting performance.
- Monitor third parties—Track the performance of services you are paying for—such as services from third party vendors, including web hosting, ad servers, load-balancing solutions, content servers, and cache server vendors.
- A monitor allows measurement for the availability and response time of a URL, Ping, DNS request, FTP transfer, or URL sequence (transaction)
- All you need is a web browser to view reports and manage your account.
- A subscription-based service that uses a global network of servers to monitor web site performance from outside the firewall, from a user perspective. Remote monitoring agents are strategically distributed on major backbone segments around the world to simulate the end-user's experience of your web site at any given moment. Without independent monitors located away from your infrastructure, there is no way to accurately assess how your e-business is performing.
- Remote Monitor detects, responds to and prevents problems in your web systems with performance insight from outside the firewall.

Historical Reports—Performance Reports are stored online (e.g., with 45 days data) for easy viewing and provide the knowledge you need to prevent problems from recurring.

Downtime costs e-businesses thousands of dollars in lost revenue or cost savings. By spending only a few hundred dollars per month to know whether your site is performing, you can quickly recapture the investment on Remote Monitor. Use the Remote Monitor reports the following data:

Availability

Html download time, Image and object download time

Connect time

Retransmit times

Partner content (ad servers, cache servers, etc.)

URL monitors

Transaction monitors

FTP monitors

DNS (Domain Name Server) monitoring

Ping monitors (for monitoring the availability of hardware such as routers)

Remote monitor can tell you how your content and application partners are performing. Remote Monitor has the ability to detect the presence of certain strings of content, such as "file not found", or specific URLs to ensure that that content partners are performing as agreed. In the event of a content or application partner failure, customers are able to immediately identify the source of a problem.

Remote monitor tell you how your cache server vendors are performing. Remote Monitor monitors cache servers by setting up a URL monitor for the cached content (e.g., HTTP://www.yoursite.akamai.com). In this manner, remote monitor can report on your cache servers performance in each geographic location.

Uses standard industry protocols to collect and organize information.

The only software required for subscribers is the Java Plug-in for your browser.

Remote Monitor's infrastructure is based on secure VPN technology.

Whether your e-business is a startup with limited URLs to monitor or a global enterprise with complex requirements, Remote Monitor can be tailored to your needs by purchasing one or more packages that focus on availability, response times, global monitoring and transaction monitoring.

Possible to export data to spreadsheets or other databases.

Remote Monitor offers monitoring capabilities such as web servers (URLs), FTP servers, and DNS. It is able to more accurately measure the true end-user performance because monitoring occurs over the Internet.

The architecture of Remote Monitor is based on a central server, database, data collection agents, and web console. Users access this data via a browser connected to the central server. This location also hosts the database and serves as the data collection point. The data collection agents are themselves strategically placed around the globe in major metropolitan locations with top backbone providers. All configuration and reporting data are available from the web browser interface.

Remote Monitor is designed to be extremely easy to configure and use. Its focus is monitoring the critical performance parameters (availability, responsiveness, and throughput) of web front-end components. With Remote Monitor, the web operation administrator can immediately:

See reports on overall web site performance and availability

Internet service providers and web hosting

Intelligently alert on site performance and availability

Evaluate Internet connectivity performance and availability and verify ISP performance Evaluate static and dynamic content performance and availability Evaluate third-party content providers Evaluate the performance of content delivery solutions Remote Monitor can be provided as a service, so the customer does not have to install or manage any software or hardware components. Access to reports, current status, and user configuration can be through a web browser interface accessible from any platform over the Internet.

Customized alert options allow the web operations administrator full control of when to be notified of site performance problems. Alert options include the ability to specify a response threshold for unacceptable performance as well as options to ensure that content is accurately delivered. Additionally, notifications can be configured so that they are sent only when performance/availability problems occur on more than one data collection agent. This minimizes false alerts that may occur due to regional/vendor network issues when most end users can still access the web site. When alert notifications are sent, they include the relevant details about the problems currently occurring, including a traceroute to pinpoint network problems if Remote Monitor is unable to reach the site. This allows web operators to quickly identify and fix the problem based on their pager messages.

Evaluate Internet connectivity performance and availability and verify performance Remote Monitor was developed to provide web operation centers with relevant connectivity information, not just data. Using strategically placed data collection agents that reside directly on major Internet backbone POPs around the world, meaningful network performance data can help identify performance issues. Remote Monitor data can help "decloud" poor internet performance and identify ISP peering issues related to backbone reliability problems. Reports can verify that ISP Service Level Agreements are being met for both reliability and connectivity responsiveness.

Evaluate static and dynamic content performance and availability

Remote Monitor was designed to collect detailed performance reporting and help provide feedback for better site design. Reports highlight where time is spent when retrieving a web page or performing a transaction (such as purchasing a book). With Remote Monitor's intuitive drill-down reporting, users can quickly assess if the site contains too many large images, or if the problem is poor network connectivity. This allows the web team to immediately focus on areas that will improve site performance and enhance end users' experiences.

Evaluate third-party content providers Remote Monitor measures time spent retrieving partner content separately from the time spent retrieving onsite content. Reports that highlight partner time allow the web team to quickly pinpoint performance issues related to third-party content. Remote Monitor can help manage third-party content providers like ad servers and ensure that SLAs are being met.

Evaluate performance of content delivery solutions The geographic coverage of Remote Monitor data collection agents allows customers to evaluate the effectiveness of a content delivery solution (such as a caching provider). By collecting data for both a cached page as well as a non-cached page over time, the web team can easily create a report to compare the responsiveness and/or availability for the two. These reports can then be used to ensure both accurate delivery of content and adequate global response.

In order to have an end-to-end perspective on the problems associated with a web site, monitoring the web components in your data center can be supplemented with monitoring site performance from a user's perspective. Inside the firewall, one can monitor the critical data center components that comprise your Web systems. This includes servers and hardware, databases, Web servers, operating systems, key Internet services like FTP and e-mail, and Web site functions such as search engines and transactions. Outside the firewall, Remote Monitor uses a global network of global servers to monitor your site's performance outside the firewall, from the end-user's perspective. The combination can provide an integrated solution for monitoring and managing the web site. The user will have a single console to use for configuring all monitoring activities on the web system, a single place to configure and generate alerts, and an integrated data repository for all management data and reports.

Makes management easier by providing real-time information as well as historical perspective.

Console provides a real-time view into the status of one or more monitored web system components. This lets you "drill down" into any current problems for further information on the recent history surrounding the situation. Holistix provides other real-time benefits through action plans that can be programmed to send an alert (for example, a pager alert or an SNMP trap) under a variety of conditions, correct the problem automatically, or some combination of these or other remedial steps.

Provides a historical perspective on web site components through reports that focus on availability and responsiveness and give a perspective on how well web components have been performing over a given time period (for example, the last week).

Continually monitors the user experience at the site and manages the critical aspects of what contributes to that experience by passively monitoring URL traffic entering each web server and by creating HTTP requests that are "injected" into the site.

When there is a problem with the responsiveness of the system, Remote Monitor can identify which component is contributing to the problem.

Business-to-business e-commerce has different demands than web storefronts. The traffic patterns between known business partners are far more predictable than the traffic between the public and a web business. The less-competitive nature of business-to-business relationships lowers the urgency for an optimal user experience, but availability of critical content (such as electronic catalogs) is of key importance.

Remote Monitor can monitor both the supplier and consumer sides of distributed content publishing and correlate the management data in a central database. Either side can then use the Console to understand or troubleshoot problems in the total content delivery system. Remote Monitor can export performance, status, and availability data so that business partners or consumers can render this information within their own management and reporting tools.

use of the web server's initial HTTP reply packet as the logical dividing line for the web client to web server HTTP packet exchange. This allows us to distinguish the initial web server reply time from the network transport time (time spent from the first HTTP data packet until the last HTTP data packet for the transaction has arrived from the web server).

use of IP Header sequence number to help distinguish out-of-order TCP packets from retransmitted TCP data packets each carrying HTTP data use of web client/server initial exchange and TCP header flags to determine if the initial HTTP reply is retransmitted or not use of retransmission time as time to discount when calculating web server processing time use of retransmission time as time to discount when calculating TCP connect processing time continuous calculation transport-to-transport (TCP-to-TCP) network latency to obtain minimum network latency for the TCP session use of round-trip network latency as time to discount when calculating web server processing time use of round-trip network latency as time to discount when calculating TCP connect processing time continuous calculation of network retransmission time (this time is subtracted when computing web server processing time and TCP connect time) and the number of packets lost using HTTP initial request and reply to determine if web page content is static or dynamic discounting (subtracting) retransmitted Get or Post request from client from web server processing time Web systems and their applications are complex, dynamic, and mission-critical. Success or failure of an e-business is often determined by how well these systems manage to ensure maximum availability, reliability, and speed. Remote Monitor detects, responds, and prevents problems that can adversely affect the user experience. It is a solution that takes into account how these components must work in concert in order to deliver a web application's benefits to the end user. This comprehensive solution provides web site managers the tools they need for rapid diagnosis of day to day problems, proactively plan to keep their site available, and meet the growing needs of their customers.

BRIEF DESCRIPTION OF THE DRAWINGS

These and other features and advantages provided by the invention will be better and more completely understood by referring to the following detailed description of presently preferred example embodiments in conjunction with the drawings, of which:

FIG. 9 shows an example network monitor architecture; and

DETAILED DESCRIPTION OF PRESENTLY PREFERRED EXAMPLE EMBODIMENTS

Overall Example Network Monitoring System

Figure 1:
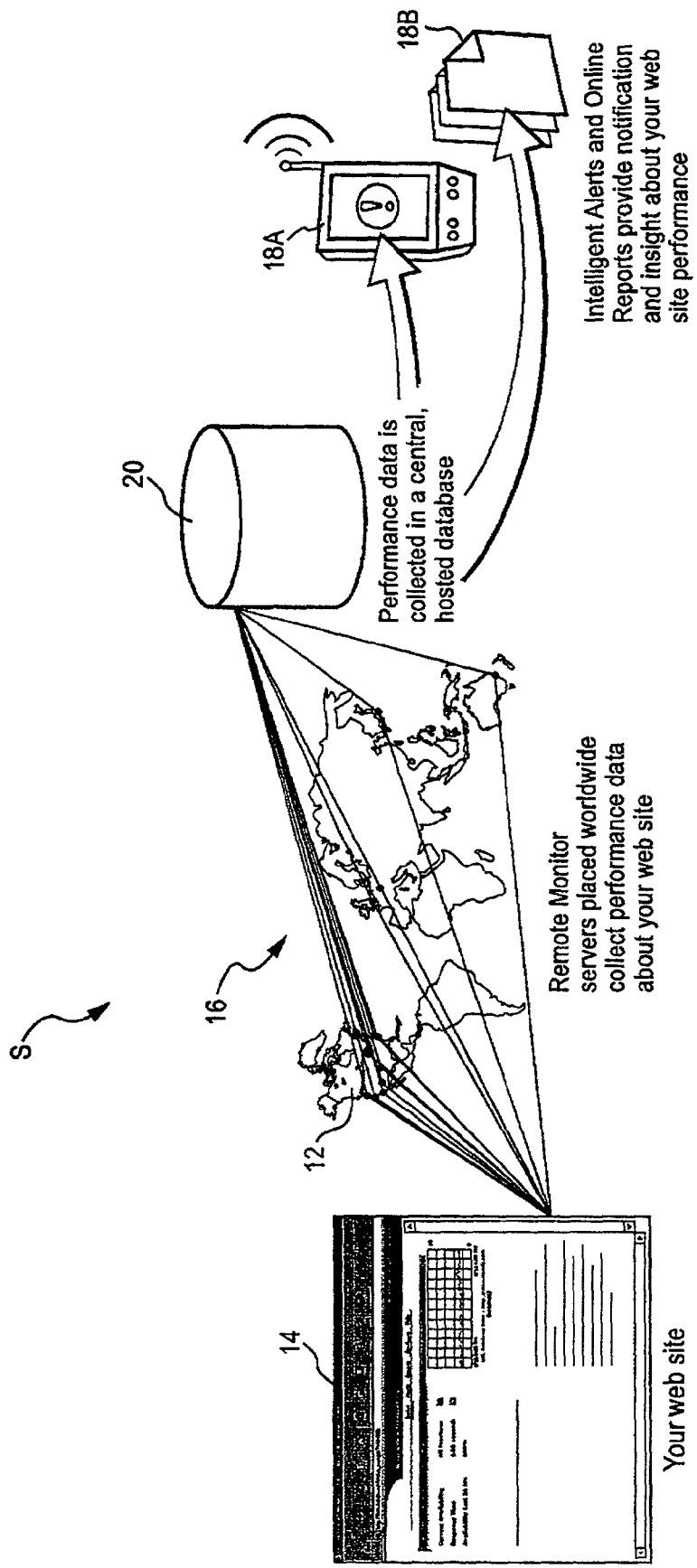
FIG. 1 is an overall functional block diagram of a preferred embodiment network monitor system provided by the invention.

FIG. 1 shows an example overall network monitor system S provided by an example preferred embodiment of this invention. System S monitors the performance of a server 14 with one or a plurality of network monitors 16 via a network 12. Network 12 may comprise, for example, the global Internet or other transaction-based digital communications network. In the example embodiment, network monitors 16 are located remotely from server 14, and are coupled to server 14 via the same network 12 that clients (not shown) of server 14 use to communicate with the server. An advantage of locating the network monitors 16 remotely from server 14 is that the network monitors in many cases will experience the same conditions (e.g., in terms of network congestion or other effects) that the actual clients of server 14 experience. This allows network monitors 16 to accurately measure and determine the cause of delays adversely impacting the performance of server 14. The ability of the operator of server 14 to have the equivalent of one or more sets of eyes out on network 12 provides valuable information about the performance of server 14 that the server operator does not have access to on-site.

In one example, the network device(s) 16 report monitoring results to a centralized database 20 for reporting purposes. Database 20 can be used to alert the operator of server 14 to performance degradation conditions through various means such as, for example, initiating a page or cell phone call to the operator's portable or stationary alerting device 18a, and providing reports 18b in hardcopy or via electronic means (e.g., e-mail, via a reporting web site, or the like).

Figure 2:
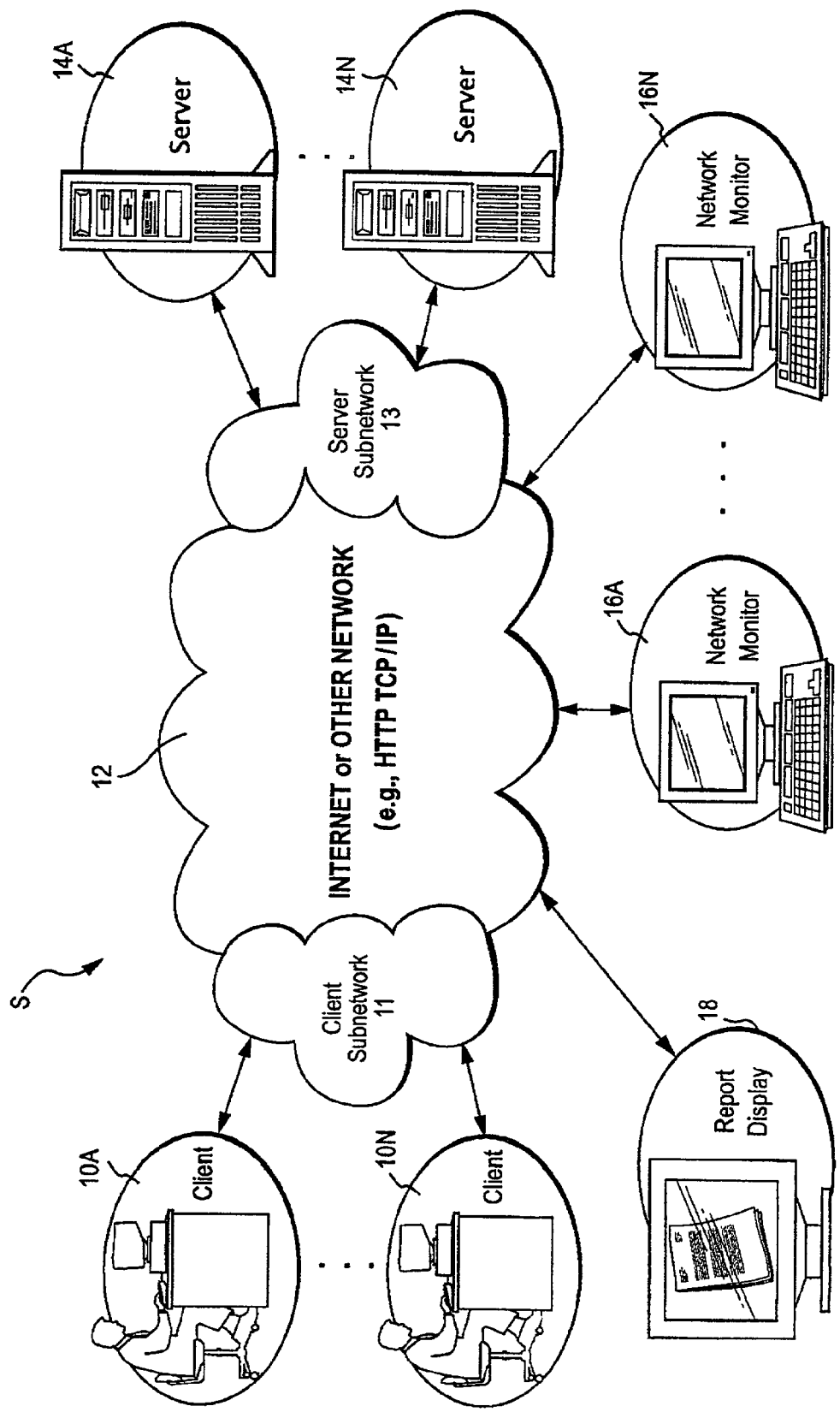
FIG. 2 is a block diagram of an example monitor system.

FIG. 2 shows a more detailed example of a network monitor system S. In the FIG. 2 example, servers 14 communicates with client(s) 10 via one or more subnetworks 13 coupled to the Internet or other network 12. For example, server 14 could be an electronic commerce web site or any other server that communicates with consumers, other businesses or the like via the Internet, and Intranet, or other electronic data communications means. Such communication can be performed using a transaction-based protocol such as, for example, the hypertext transfer protocol (HTTP) as described, for example, in RFC 2616 (IETF) incorporated by reference herein. Such a transaction-based protocol can be used to communicate a variety of different message packet types including, for example, web pages defined using hypertext markup language (HTML). The HTTP transactions can be supported by a network connection established using, for example, Transmission Control Protocol/internet Protocol (TCP/IP) as described, for example, in RFC 791 and 793 (IETF) (also incorporated by reference herein). The invention is not limited to HTTP and TCP/IP, but can be used with any transaction-based network communications protocol. Such protocols of the type currently in wide spread use on the Internet are described here for purposes of illustration only.

As also shown in FIG. 2, one or more network monitors 16 are coupled to network 12. Network monitors 16 are used to monitor network communications between server 14 and client 10. In one example embodiment, network monitors 16 are located remotely from both server(s) 14 and client 10. For example, network monitors could be located at the site of a network monitoring service that offers network monitoring on a subscription or other basis to the operator of server 14 and any number of additional servers 14. In one advantageous arrangement, network monitor 16 is coupled to the subnetwork 13 that server(s) 14 are coupled to so as to facilitate monitoring of traffic between the server(s) 14 and client(s) 10. In another example embodiment, one or more network monitors 16 could be placed locally with server 14 and/or client 10. In still another arrangement, network monitor 16 could be equipped with sophisticated traffic monitoring functionality (e.g., such as that possessed by national security agencies) to allow it to monitor traffic on the Internet 12.

In one particularly advantageous example, network monitors 16 are located in a distributed fashion at various nodes or other geographical presence points of network 12. For example, if server 14 serves clients 10 located worldwide, network monitors 16 can be distributed throughout the world. For example, a network monitor 16a could be located in California, another network monitor 16b could be located in New York, a further network monitor 16c could be located in London, yet another network monitor 16d could be located in Tokyo, etc. Such a distributed system of network monitors 16 provide a capability to monitor actual network conditions prevailing throughout network 12, and can be used to measure the speed and other performance of server 14 throughout network 12. While a plurality of network monitors 16 distributed network 12 provides certain advantages, the invention is not limited to a plurality of monitors but can be used with only a single network monitor.

In the example embodiment, network monitors(s) 16 measure the performance of server 14 and can report the resulting measurements to a report display 18. For example, report display 18 can also be coupled to network 12 and can be located at the same or different location from server 14. In one example, report display 18 can be a web-enabled appliance such as a personal computer, cell phone, PDA or other device, and network monitor 16 can report the results of network monitoring measurements to the report display.

In one example mode of operation, network monitor(s) 16 can operate passively by monitoring the data communications traffic between server 14 and client 10. For example, a network monitor 16 can listen to network 12 (subnetwork 13) to detect requests for web pages or other information from a client 10 to server 14, and may monitor the response provided by the server to the client. Using such monitoring techniques, network monitor 16 can determine speed performance and other parameters associated with server 14 and/or network 12. Network monitor 16 can be co-located with server 14 so as to obtain geographic network latencies, packet loss, etc. Network monitor 16 can monitor requests from a number of different clients 10 located at different points within network 12 so as to measure performance degradation resulting from network congestion or other network-related factors as opposed to performance degradation resulting from the performance of server 14. In this way, system S can determine whether slowdowns are the result of problems within server 14, problems within network 12, or both.

In another mode of operation, network monitor(s) 16 can themselves initiate requests to server 14 and receive responses from the server—or other software on the same or different computer that supports the network monitor(s) 16 can impersonate a web browser to initiate such requests. When network monitor(s) 16 act as clients in this active mode, they add to the loading of server 14 which may be undesirable under heavy loading conditions. On the other hand, if network monitor(s) 16 do not initiate too many requests, such active mode can be used to supplement (or in some cases as a substitute for) passive monitoring of data communications traffic between client 10 and server 14.

In one particularly advantageous example, network monitor(s) 16 could trigger real-time events based upon percent packet loss or other determinations. As one example, network monitor 16 could automatically trigger a process to perform a "traceroute" to help determine the exact location of a packet loss problem. This could be especially helpful, for example, to an Internet Service Provider in maintaining good service and in isolating problems occurring on clients 10 being supported by the Internet Service Provider.

In another advantageous example, network monitor(s) 16 co-located with server 14 could trigger real-time events based upon packet loss or other determinations. As one example, network monitor 16 could automatically trigger a process to perform a "traceroute" to help determine the exact location of a packet loss problem. This could be especially helpful, for example, to determine if an Internet Service Provider is maintaining good service to server 14 as well as to isolate general problems, or geographic location problems, from any client 10.

Placing network monitor(s) 16 remotely from server 14 (and client(s) 10) provides certain advantages. For example, remotely located network monitor(s) 16 are often able to more directly measure the types of conditions that prevail at clients 10 distributed throughout network 12. Also, network monitor(s) 16 can be operated by an entity different from the one that operates server 14 to provide a network monitoring service to one or more server operators. For example, a network monitoring service can install a number of network monitors 16 at various locations on network 12, and offer subscription-based network monitoring services to a large number of different servers 14.

In one particularly advantageous arrangement, for example, such network monitoring subscriptions can be initiated over network 12 using a web browser based interface. A server 14 operator can subscribe to the network monitoring services by completing a web-based form, and by providing a URL, IP address or other network address or other locator to the network monitor(s) 16, and providing some form of payment (e.g., credit card, billing address or the like). Network monitor(s) 16 can begin monitoring the performance of remotely located server 14 substantially immediately, and provide reporting also via network 12 to report and display 18. In this way, a new business can be supported that uses the existing network 12 infrastructure and one or a number of network monitors 16 to monitor the performance of any number of servers 14 communicating over network 12 with any number of clients 10.

While remote location of network monitor(s) 16 provides certain advantages as described above, it also creates certain challenges. In particular, it is a challenge to provide useful performance diagnostic information based only on observation of traffic flowing over network 12. More specifically, it may be important in offering such network monitoring services to diagnose whether performance degradations are due to problems at or within server 14, problems existing within network 12, or both. The example embodiment solves this problem by calculating network round-trip latency based on communications flowing back and forth between client 10 and server 14. In other words, by monitoring certain parameters (described in detail below) in connection with the transaction-based protocols used by server 14 to communicate with client 10, network monitor(s) 16 of the example embodiment can deduce which portions of overall network delays are due to latency existing within server 14 and which part of the overall delay is due to transport over the network 12. Such deduced information is very useful in helping the operator of server 14 to isolate problems of slow response when, for example, a web browser user requests a web page from server 14 and has to wait a long time to receive the page.

Example Techniques for Remotely Monitoring Response Time

Figure 3:
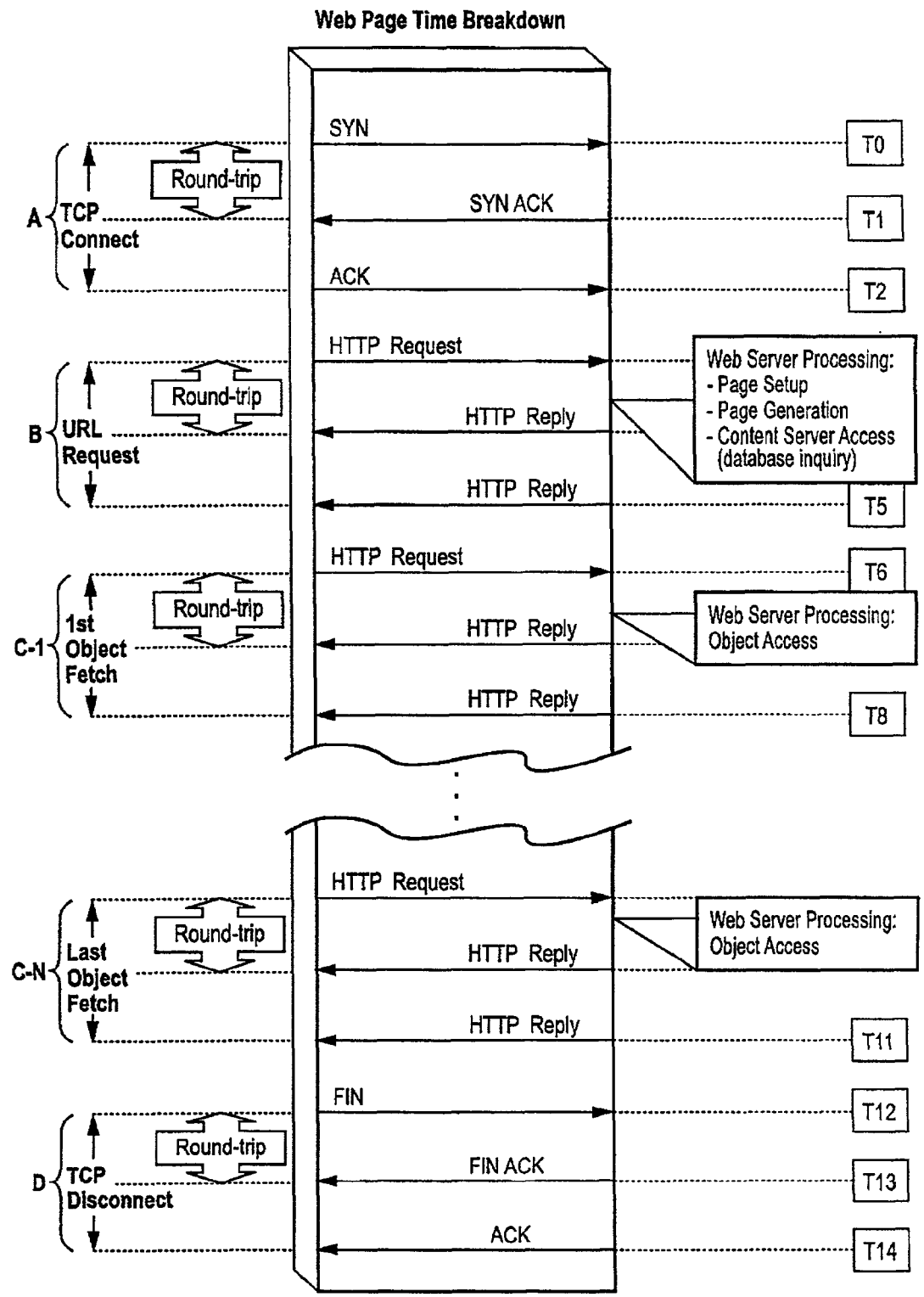
FIG. 3 shows example network transactions.

FIG. 3 shows an example typical transaction between a client 10 and a server 14 using a transaction-based protocol. The FIG. 3 example illustrates a request for a web page being initiated by client 10 to server 14. The steps involved in fulfilling this request include:

request for a TCP connection and the establishment of such a connection (phase A)

request for a particular web page maintained by the server at a specific universal resource locator or other network address (phase B), depending upon the type of web page being delivered, one or more additional object fetches (e.g., inline graphics or the like) each initiated by the client 10's browser parsing the web page delivered in phase B and transmitting an additional request for a particular object to server 14 (phases C1-CN), once the web page and all (any) inline objects associated therewith have been received by client 10, breaking down the TCP connection (phase D).

Each of the various FIG. 3 phases includes a latency or time delay. In a network, latency (a synonym for delay) is an expression of how much time it takes for a packet of data to get from one designated point to another. In accordance with one aspect of the invention, network latency is measured when a packet is sent and a reply or acknowledgment packet comes back to the sender. This round-trip time is considered the network latency. The contributors to network latency include:

Propagation: This is simply the time it takes for a packet to travel between one place and another at the speed of light.

Transmission: The medium itself (whether fiber optic cable, wireless, or some other) introduces some delay. The size of the packet introduces delay in a round trip since a larger packet will take longer to receive and return that a short one.

Router and other processing: Each gateway node takes time to examine and possibly change packet headers Other computer and storage delays: Within networks at each end of the journey, a packet may be subject to storage at intermediate devices such as switches and bridges.

When the network monitor measures network latency, it measures the round trip time between the TCP transports of the client and the server. The network monitor calculation will thus include additional (minimal) processing time of the network stack on each node.

Being able to determine network latency time is very useful. For example, when HTTP response times are slow, measuring and quantifying network latency and differentiating it from web server application processing time helps determine where the problem may lie and what may need to be examined further to address the slowness.

Figure 4:
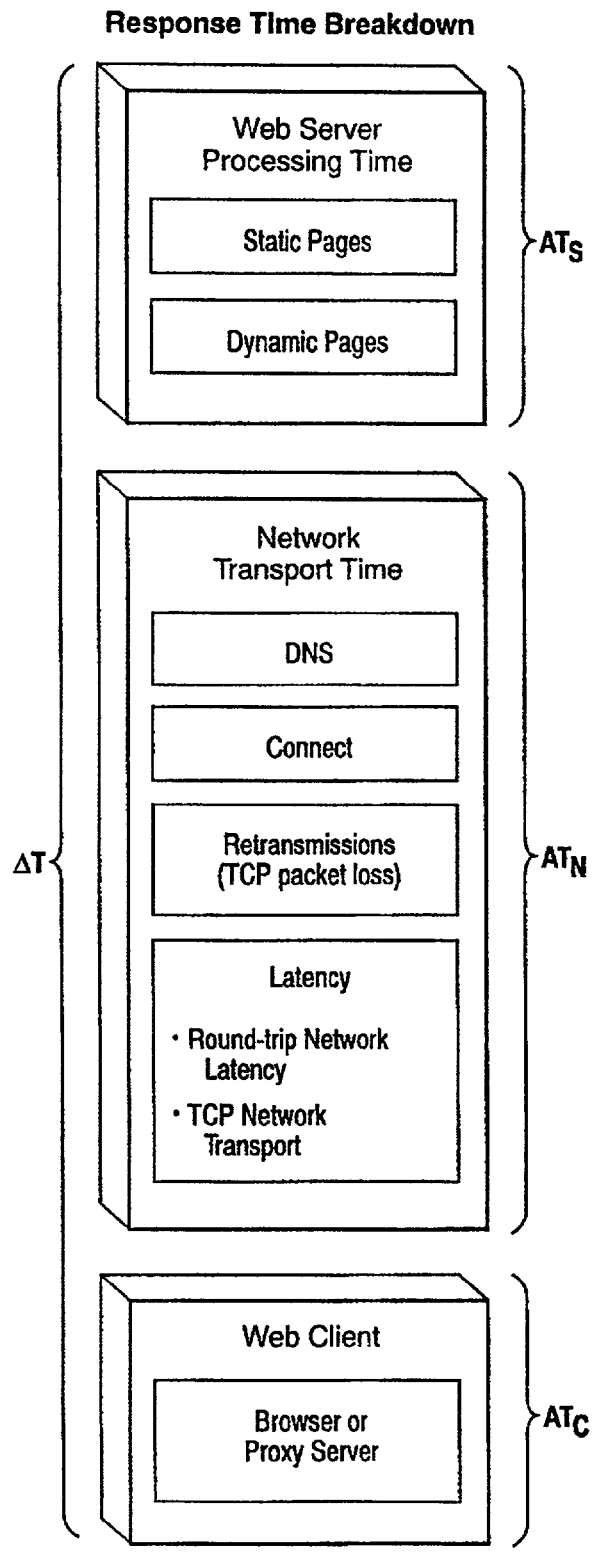
FIG. 4 illustrates the various latencies within an example network transaction.

FIG. 4 shows an example breakdown of this response time. The total response time ÄT is made up of three different components:

the time which server 14 uses to fulfill the client 10's request, i.e., web server processing time $ÄT_s$, the amount of time required for the request and associated response to be transmitted over network 12, i.e., the network transport time $\ddot{A}T_n$, the amount of time for client 10 to receive and process the response, i.e., the web client processing time $\ddot{A}T_c$.

When a response time monitor is co-located with a server 14, it is relatively eacy to monitor the web server processing time $\ddot{A}T_s$. For example, one can log the time when incoming requests are received by the server 14's firewall, and the time when the associated response to the request leave the firewall.

Network monitor 16 can get the network transport time (Tn), web processing time, web client processing time (Tc), retransmit time, dropped packets, and network latency when it is co-located with the server 14 or when it is remotely located. Generally, the same techniques can be used in both the remote location context and in the locally connected context. When remotely monitoring delays associated with the response to a request, it is relatively easy to determine the total delay $\ddot{A}T$ as well as the total delay attributable to the combination of web server processing time $\ddot{A}T_s$ and network transport time $\ddot{A}T_n$ ($\ddot{A}T=\ddot{A}T_s+\ddot{A}T_n$). For example, a remote monitoring device can send a request to server 14 and receive a response, or it can monitor a request sent by another client 10 and log both the time at which the client sends the request and the time at which the client receives the response. But, using these techniques, there is no way for the remote monitor to determine which part of the total latency is attributable to web server response time $\ddot{A}T_s$ and which part is attributable to network transport time $\ddot{A}T_n$. The present invention solves this problem by carefully monitoring different aspects of various transactions and deriving a measure of round-trip network latency. This round-trip latency parameter can be subtracted from the total latency to derive a measure of web server processing time $\ddot{A}T_s=\ddot{A}T-\ddot{A}T_n$.

In more detail, a transaction-based protocol such as HTTP for example, uses a network transport protocol (e.g., TCP) to establish a session (e.g., a connection) between a web client and the web server. The time spent for this connection to complete may be termed TCP connect time (see FIG. 5, block 50). This time calculation generally includes network latency and other possible network-induced delays that could occur. The remaining time, once these other factors are discounted, is the TCP connect processing time (FIG. 5, block 54) (e.g., the time for establishing a TCP connection).

Figure 5:
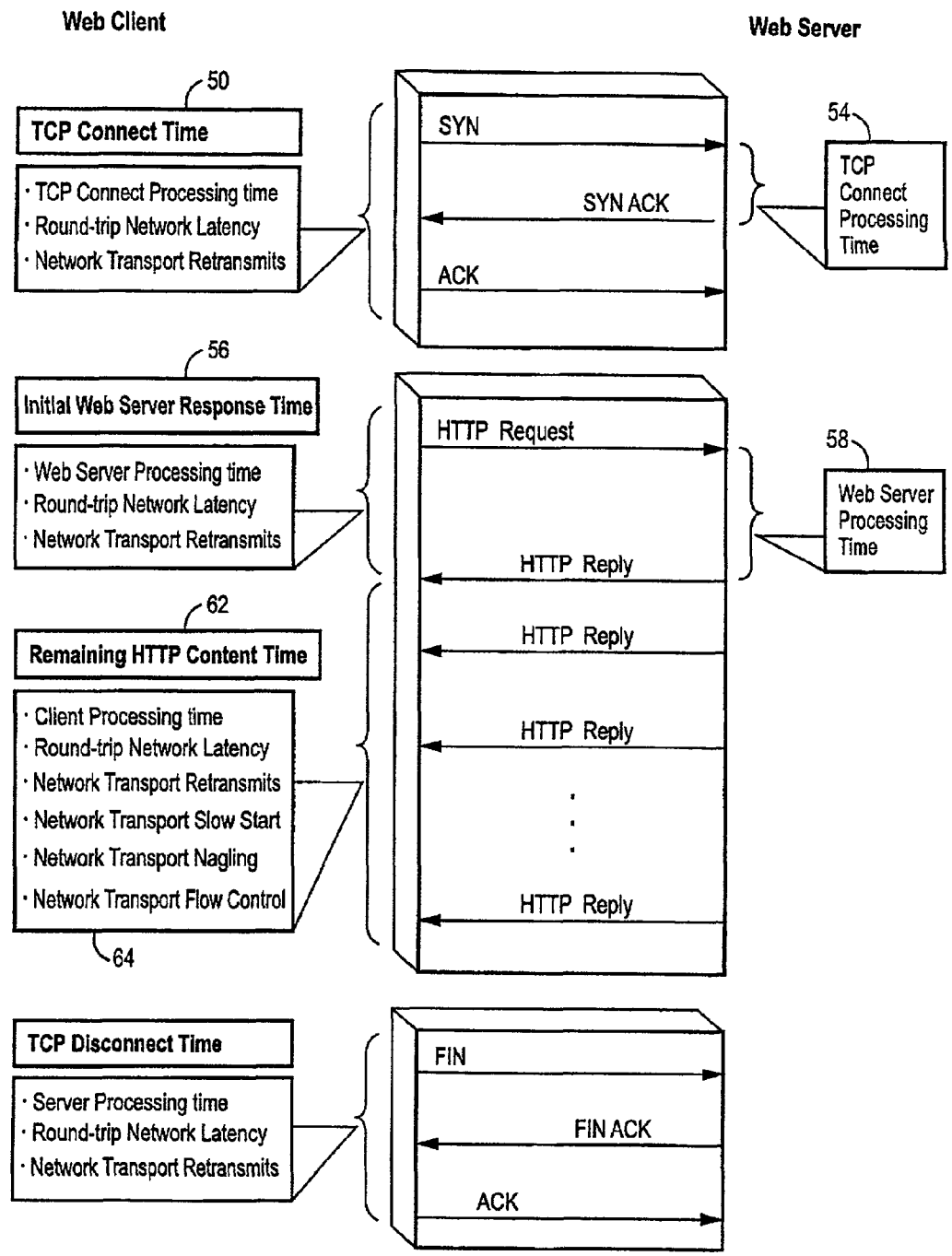
FIG. 5 shows an example detailed web page request time breakdown.

After the TCP connection is established, the web client typically sends an HTTP request to server 14 and receives the associated HTTP reply that comes back from the server 14. We call this the initial web server response time (FIG. 5, block 56). From this point until the point when all of the packets in the HTTP reply are sent back to the client 10 may be called the Remaining HTTP Content Time (FIG. 5, block 62). Dividing the HTTP transaction into these distinct parts lays the foundation for breaking down the overall response time.

Initial Server Response Time

When monitoring the HTTP session from the server 14, the time between the client request until the server replies (initial web server response time, block 56) is easy to obtain. This time (Web Server Processing Time, block 58) represents how long the server 14 application actually spent processing the request. The initial server 14 response time includes, for example, web page setup, web page generation, and content server access time in a web-server based context.

When this same initial web server response time measurement is taken by monitoring from a remote site network monitor 16, it is not easy to separate the network-induced delays (e.g., packet loss and network latency) from the actual web server processing time (block 58). However, from a network monitor 16 we can gather this information by also monitoring a network transport protocol such as TCP for example. For the duration of an HTTP session that uses TCP, for example, it is possible to compute network latency time as well as lost time due to data retransmissions.

Figures 6, 8:
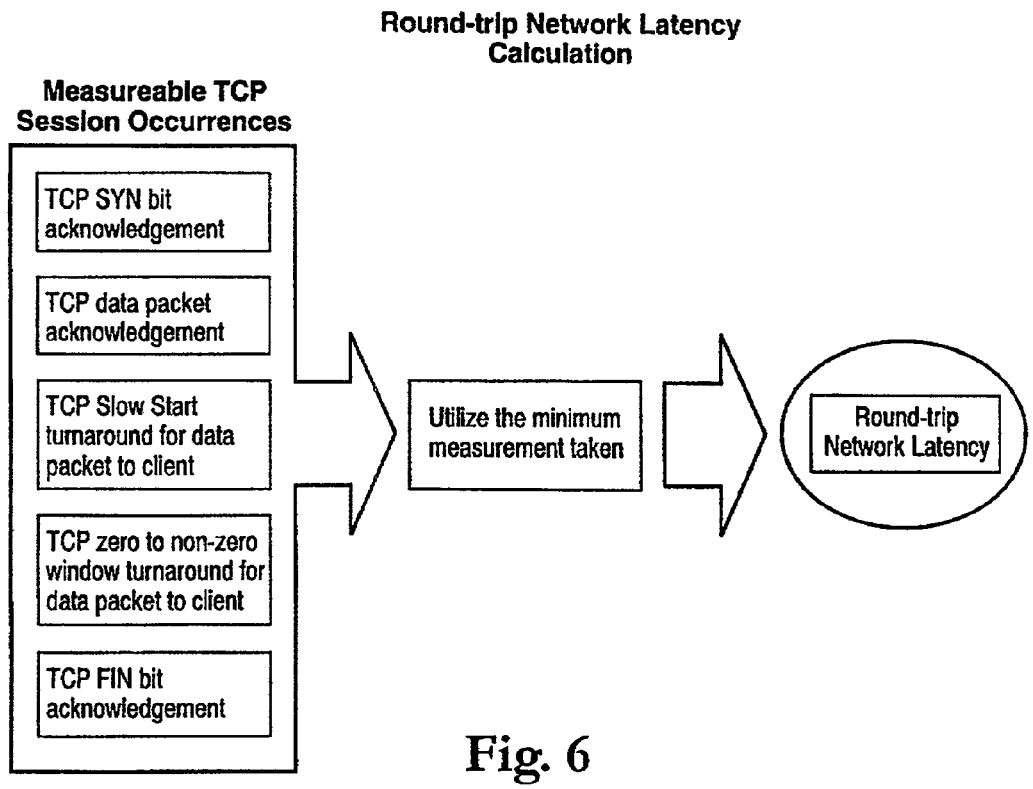
FIG. 6 shows an example round-trip network latency calculation.
FIG. 8 shows an example connect time metric bucket breakdown.

To monitor round-trip network latency, we can use the acknowledgment field in the TCP header that indicates the remote peer has sent packet and the acknowledged packet is the round-trip latency (although we should note that transport-to-transport latency like this does involve a minimal amount of transport protocol processing). For the course of the TCP session, network monitor 16 continuously calculates the minimum round-trip network latency as shown in FIG. 6. As shown in FIG. 6, various characteristics/features of the transport protocol can be used to determine minimum network latency from which round-trip network latency can be derived:

TCP SYN bit acknowledgement,
TCP data packet acknowledgement,
TCP slow start turnaround for data packet to client,
TCP zero to non-zero window turnaround for data packet to client,
TCP FIN bit acknowledgement.

To monitor data retransmissions, for example, we can keep track of the sequence number field in the TCP protocol header for an HTTP session. Any time the TCP sequence number of a packet is less than or equal to the highest TCP sequence already sent, this packet is a candidate for being a data packet that must have been retransmitted. Using the packet time-stamp data between the retransmitted packet and the time that it should have arrived in sequential order, a calculation for network transport (TCP) retransmission time can be made.

Deriving Web Server Processing Time

Once the TCP session has terminated, we can subtract out the derived round-trip network latency as well as any network transport (TCP) retransmission time from the initial web server response time in order to derive the web server processing time. This is time spent by the remote web server application to process the client request. Likewise, using the same algorithm, we can derive TCP connect processing time on the web server when we discount the round-trip network latency time as well as any TCP retransmissions that occurred during the TCP connection establishment. It is also possible to use a low cost method (e.g., "ping") to estimate (as opposed to deriving) the network latency, and subtract out this estimated value to obtain web server processing time.

Deriving Web Client Processing Time

It is also possible using the remote monitor 16 provided by the example embodiment of this invention to, under some circumstances, determine the amount of time a client spends processing requests from server 14. For example, sometimes a client 10 can't process transmissions from a server 14 fast enough and the network transport (TCP) on the client 10 employs flow control to slow down the server 14. Network monitor 16 can determine this and provide measurements and reports that take this effect into account.

Remaining HTTP Content Time

The remaining HTTP content time is logically separated from the initial web server response time because negligible web server application processing time is spent during this period. Before the initial HTTP reply from the web server is sent to the client, the web server does all the required processing necessary to generate all web page data to be sent to the client. This time includes web page setup, web page generation, and content server access. All web page content is then passed down to the network transport (TCP) protocol. Thus, any web server application processing time is negligible and is therefore attributable to the network transport protocol. Web page content delivery delays are attributable to the following conditions:

client processing time,
round-trip network latency,
network transport (TCP) retransmissions,
network transport (TCP) slow start,
network transport (TCP) nagling,
network transport (TCP) flow control.

Example Remote Monitoring Flow

Figure 7:
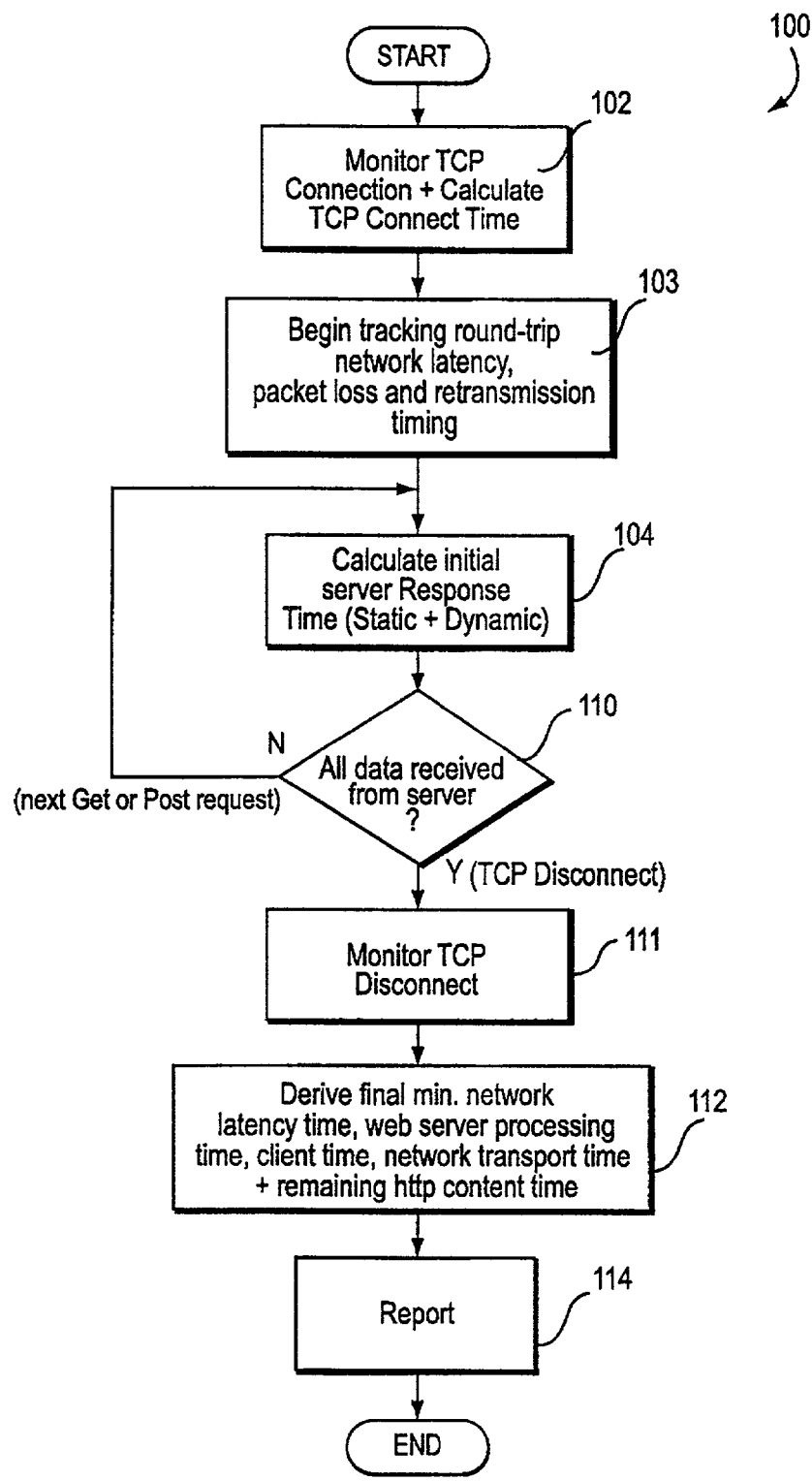
FIG. 7 is a flowchart of example steps performed by the FIG. 2 network monitor.

FIG. 7 shows an example flowchart used to perform a network monitoring operation in accordance with an example preferred embodiment of this invention. In the FIG. 7 example, a monitoring device 16 including, for example, a network adapter card programmed to operate in the so-called promiscuous mode is used to monitor the TCP and HTTP (or other transaction-based) protocol exchanges between the client 10 and a server 14 (or the same techniques could be used for monitoring peer-to-peer communications).

Calculate TCP Connect Time

In this example, monitoring device 16 first calculates the TCP connect time (block 102) by, for example, calculating the time from when the SYN packet is sent by client 10 to server 14 until the time the server replies with a SYN ACK (acknowledgment) packet. If the monitoring device 16 is co-located with server 14, then this measurement directly indicates how quickly server 14 can initiate an TCP session. When this same measurement is taken with monitoring device 16 being located remotely from server 14, the time calculation will also include network latency, other possible network-induced delays that could occur, and TCP connect processing time spent on the web server.

As is generally known, the TCP connection does not actually complete until the final acknowledgment (ACK) is sent by the client to the server 14. It is possible to separate an initial TCP connect time from a final TCP connect time to include this last acknowledgment if necessary (particularly if monitoring is co-located with the web server).

In the example embodiment, network monitor 16 also begins continually tracking round-trip network latency, packet loss and retransmission timing (block 103). Such tracking can begin at the same time as block 102 begins to monitor, and can continue through the actual TCP disconnect (which completes in block 111).

Calculate Initial Server Response Time

Measuring device 16 also calculates an initial server response time parameter (block 104). This initial server response time is the amount of time used for an HTTP Get or Post request from client 10 until server 14 replies with an HTTP OK (or some other HTTP response). If monitoring device 16 is co-located with server 14, then this calculation represents how quickly the web server can turn around a client request. Such a response time measurement, when taken locally at the server 14, reflects all of the actual web server application processing time for the request. Server 14 gathers all of the information to be sent to client 10 before the initial reply to the client. This information gathering time includes, for example, web page setup, web page generation and accessing any necessary content servers. Once all of the data is ready to be sent to client 10, it is all handed to the network transport layer (TCP) on server 14 to then be transmitted to client 10. This initial server time response measurement is a very accurate indication of the amount of real server application processing time spent for the client request.

When this same initial server response time measurement is taken in the context of monitoring device 16 being locate remotely from server 14, the time calculation will also include network latency, other possible network induced delays that could occur, and of course, the web server processing time itself. In this remote case, the distinction is blurred between the actual web server processing time, network latency, and other network-induced factors. However, by separating out the network latency and network-induced factors, we can still determine web server processing time in a remote context.

Static or Dynamic Web Page Content Determination

HTTP requests sent from the client 10 to the server 14 can be for static or dynamic web content. It is useful to be able to distinguish between the two. Replies to dynamic content requests usually include requests for information from a back-end database, and this can take a significant amount of time if the database query or the connection to the database is slow. An initial reply is often delayed when dynamic content is requested by the client 10 and is reflected in the delayed response time to the client. Since static content generation time is quicker, it makes sense to create at least two separate initial server response time categories—one for static and one for dynamic content pages.

To determine if the web page content is static or dynamic, the step of block 104 can examine the HTTP header reply. If the reply indicates that there is a "content length" with a number of bytes immediately following, then this is handled as a static page. Alternatively, if server 14 uses HTTP 1.0 reply instead of an HTTP 1.1 reply, it can be presumed that the content of the page is static since HTTP 1.0 does not support dynamic content. All other content that does not meet these conditions can be assumed to be dynamic.

Calculate Remaining HTTP Content Time (Network Transport Time)

After the HTTP web server reply to the Get or Post request has reached client 10, there is often more HTTP data to follow from the web server (see FIG. 3, phases C-1 to C-N). The network monitor 16 can determine whether all data has been delivered from the server (decision block 110) using various techniques. One technique is to detect whether the client 10 has issued another HTTP Get or Post request. The issuance of the second client 10 request indicates that the previous request is complete. This assumes, that over a given TCP session, there cannot be more than one request outstanding at a time. Another technique that network monitor 16 can use to determine server 14 has completely satisfied the request of client 10 is to monitor whether the TCP connection is closed by either client 10 or server 14 (see FIG. 3, phase D). In any of these cases, the A (time delay) between HTTP reply packet and the last sent packet with user data from the server 14 to the client 10 can be used to determine remaining HTTP content time. For example, once all HTTP reply data for an individual Get or Post request has been received, block 110 may wait for either the next Get or Post request OR a TCP disconnect sequence. If the next Get or Post request occurs, then we go back to block 104 and calculate the next 'Initial Server Response Time'. If a TCP disconnect sequence begins, we continue to monitor the TCP disconnect until it completes in block 111, then we derive the final calculations for min network latency, web server processing time, client time, network transport time, etc. in block 112.

The network transport time as described above is the time from the initial web server HTTP reply packet until all content is delivered to the web client 10. The network transport time from server 14 to client 10 also initially includes HTTP client processing time spent by client 10. Any HTTP client processing time that occurred during this time needs to be subtracted. Lastly, any transport retransmission time of the client Get or Post request sent to server 14 needs to be included as network transport time. When a client 10 retransmits a Get or Post request, this time is discounted as web server processing time since the server 14 presumably did not receive the request. We then restart our web server processing time calculations all over again. The time taken during the retransmit instead gets included as network transport time. The resulting values can be reported (block 114).

In more detail, the remaining HTTP content time calculation includes network latency as well as possible network-induced delays that could occur during the transmission of the data, regardless of whether the network monitor 16 is local or remote from server 14 (see FIG. 6). This remaining HTTP content time parameter includes, in addition to client processing time, the following:
- round-trip network latency,
- TCP transport retransmission,
- TCP transport slow start algorithm,
- TCP transport flow control,
- TCP transport nagle algorithm.

In the example embodiment, the remaining HTTP content time is categorized as network transport time. When the server 14 application delivers all client web page data to the network transport, the remaining HTTP content time starts as soon as the first packet is sent to client 10. All time spent delivering the remaining HTTP content is attributed to the network transport factors listed above—not the application running on server 14.

Track Network Latency

In the example embodiment, network monitor 16 derives estimated network latency (see FIG. 6) by continuously computing round-trip times for data that is sent and acknowledged by the remote peer. Network monitor 16 can, for example, time stamp both TCP data packet and TCP bit flag (SYN or FIN) packet requests when they are sent to the remote peer. Network monitor 16 can then compute how long it takes for the packet to be acknowledged by the remote peer and then derive an estimated network latency time for one round trip. There can be multiple round trips for a TCP session. The value of the minimum network latency time for the duration of the TCP session is continuously kept to determine the final minimum network latency time once the TCP session is terminated (block 111).

Another calculation that can provide a snapshot of the network latency time is the examination of TCP slow start algorithms employed by web server for congestion avoidance. The value obtained will be used in the same manner as described in the retransmission time calculation above. If this value is less than any previous network latency time, then this value may be used instead.

A network latency time measurement can be obtained when the web server 14's TCP stack employs the slow start algorithm. This is calculated for the first HTTP Get or Post request for a TCP session sent to the web server for which the web server sends at least three data packets in response to this HTTP request. First, a time stamp is made of the acknowledgment (ACK) sent to server 14 for the second data packet sent from the server in its initial HTTP reply (provided packet 1 or 2 from the server is the TCP negotiated MSS size). A slow start algorithm on the server prevents packet 3 from being sent until packet 2 is acknowledged by client 10. Second, a time stamp is made of the third data packet sent from the web between these two time stamps is a very accurate network latency time calculation.

Calculate HTTP Total Time

The HTTP total time is the time from the Get or Post request from client 10 until all of the data is sent from the server 14 to the client 10. This time calculation will include network latency as well as possible network induced delays. These delays should occur during transmission of the data regardless of whether the network monitor 16 is local to or remote from server 14. Alternatively, this same HTTP total time can also be determined by adding together the network transport time, web server processing time and web client processing time parameters.

Calculate Web Server Processing Time

Web server processing time is the amount of time spent responding to the Get or Post request from the client 10. The web server processing time can be determined easily when measured on the same network as server 14 because no network-induced delays need to be accounted for (network-induced delays would rarely occur in this instance). In context in which the network monitor 16 is local to server 14, the initial server response time parameter described above accurately measures the web server response time.

On the other hand, for non-local network monitors 16, this calculation is much more difficult because of network-induced delays. In order to calculate web server processing time in such remote contexts, network latency time is subtracted from the initial server response time. Finally, subtracting any retransmission of the Get or Post request sent to the web server 14 results in an accurate web server processing time value measured from a remote site (see FIG. 7, block 112).

Calculate Client-Introduced Delays

During the course of an HTTP transaction, there are times when the web client cannot keep up with what is being sent from the server. For example, the user may have intervened in the downloading of web content, the web client is processing content too slowly, or perhaps a (busy) proxy server (e.g., America Online) is servicing downstream clients running over limited bandwidth. When this happens, TCP flow control prevents server 14 from sending any more data until client 10 is ready. At the TCP level, the TCP protocol header window size advertised by the client 10 to the server 14 is zero (the client 10 has room for zero more bytes of data). When client 10 (actually the web client application, not to be confused with the TCP stack on client 10, in the example embodiment) consumes enough received data, the TCP flow control mechanism increases the window size advertised to server 14. Until the TCP protocol header update (with a modified non-zero window size) is sent from the client 10 to the server 14 happens, there was dead period of time that would normally count against network transport (TCP) latency time. However, if the amount of time spent in this state is maintained, this time can be discounted from the network transport time (block 112). Such client processing time may, thus feature, in one example:
- use of TCP zero byte windows sent by the client to account for time spent as web client processing time,
- discounting this calculated time from network transport time.

window update by the client 10 and the (following this) first non-zero byte TCP window update by the client 10 is the HTTP client processing time that can be subtracted to obtain a another measure of network latency.

In some cases, when HTTP client processing time is measured at the locale of server 14, the actual client may not necessarily be the end user's desk top machine. Many web users use proxy servers on their behalf (e.g., AOL), and in this situation, it may be a proxy server advertising a zero byte window rather than the actual client desk top machine.

Calculate Packet Loss and Retransmission Parameters

It may also be useful to calculate packet loss, i.e., the number of times it is believed that TCP packets have been dropped from the sending side of an HTTP session (either the client 10 or the server 14). A dropped packet typically means a packet was sent out initially and the packet originator had to re-send the packet. Generally, packets being lost (dropped)

between server 14 and client 10 may be more likely to occur (at least in the context of a web server) since a greater abundance of data is sent from the web server to the client. Block 103 considers a packet to be lost if the sequence number in the TCP header sent out is less than or equal to any previous sequence number that was sent. If this is the case, the sender could be re-transmitting previously transmitted data, but more information is required. On the Internet, for example, it is very normal that packets arrive out of order because of the nature of IP layer routing. If network monitor 16 is not co-located with server 14, additional checks using the IP Header Sequence IDs and inter-packet timing information can be used to differentiate between TCP packets that arrive out of order because of Internet routing issues and TCP packets that are truly lost or dropped.

Using knowledge of the HTTP protocol, it is possible to determine another retransmit condition. The initial HTTP Get or Post client 10 request requires an immediate server 14 reply. This data packet reply can be retransmitted even though it does not arrive, necessarily, as out-of-order data. It is possible to determine that this is a retransmit condition by looking carefully at the HTTP reply from the server 14. If the reply arrives after a TCP delayed ACK (acknowledge) timer that server 14 would have fired to generate a naked delayed ACK (to the initial HTTP Get or Post packet) with no accompanying data and if no naked delayed ACK came from the server 14 it can be deduced that this is a TCP retransmitted packet.

In cases where the packet loss (dropped packet) condition has been detected, the "to web server" and "to web client" retransmission times for those packet losses can be calculated (block 103) independently. On a network monitor 16 that is local to server 14, the retransmission time is calculated from the point the original packet was sent out by the web server 14 until the retransmitted packet actually left the server. In the case where network monitor 16 is not local to server 14, the retransmission time is calculated by using the older of the following two time stamps:

the last TCP packet receive that was acknowledged by the client 10, or the time stamp of the last client acknowledgment of TCP data sent from server 14 when there is more than one TCP packet outstanding.

retransmitted frame time stamp is the retransmission time.

Oftentimes when there is retransmitted data, the device sending the retransmitted data may do so in a manner that is not conducive to the efficient use of the network. For example, sometimes the sender fears its data got lost and tries to retransmit the packet data to the client too quickly. Duplicate (or gratuitous) data is a packet that is sent for no good reason because the remote peer has already sent an acknowledgment for this retransmitted data. When network monitor 16 is located remotely from server 14, notifying a network administrator when this situation becomes severe (i.e., lots of duplicate data sent from the web server) can be very useful. It may be that the web server 14 has a retransmit timer that is too aggressive and it needs to be tuned. When network monitor 16 is co-located with server 14, too much duplicate data being sent from the client 10 may mean that the TCP delayed acknowledgment timer set too passively and needs to be a bit more aggressive.

Calculate HTTP Data Size

Another parameter of interest is HTTP data size or average size. This parameter is the total amount of HTTP payload data that is sent from the server 14 to the client 10 that resulted from an HTTP Get or Post request. Both the HTTP send and HTTP receive data totals are kept, but the only one that is of use is the HTTP receive data. Average page size calculations could be made using this value as well.

Calculate Average Hop Count

Although not particularly relevant to the calculations described above, the average hop count calculation could be used for comparative purposes. In particular, average hop count could be used to contrast the apparent network distance between various measuring locations and the server 14 that is being monitored. The average hop count is calculated by looking at every IP packet that comes from server 14 to obtain the "time to live" (TTL) field in the IP header. The average TTL value is calculated once the TCP session closes, and can be used for comparison purposes to other sites accessing the same web server 14. The average TTL value received by the network monitor 16 does not reflect the actual number of hops from the web server 14 to the web client 10. TCP/IP stacks start the TTL field (which is decremented by one with each hop on the Internet) with different values depending upon how the server 14's TCP stack is configured. Because of this variation, this calculation can be used for comparison purposes only when connecting to the same web server 14 site. In order to get a real hop count, we can inject TCP packets destined to server 14 (using web server port number) using a mechanism much like traceroute. The benefit of this approach is that the ICMP time-exceeded datagrams should come back to client 10 for the TCP packets sent to server 14. In the case of traceroute, the generated ICMP echo request packets to server 14 are discarded for security reasons by many web sites and networks.

Report information gathered by the network monitor 16 for various metrics can be placed into specific "buckets" for use by another platform or application (block 114). Each of these "buckets" can be divided into groupings of time or quantity. Groups will represent a range of acceptable to unacceptable metric values. For example, if a metric is collecting the amount of time taken to make an HTTP connection from a web client 10 to a web server 14, one might create a "bucket" with the breakdown of possible connect times as shown in FIG. 8. In the FIG. 8 example, one might consider all except the last "bucket" of four seconds or higher to be perfectly acceptable connect times for the client 10. However, if the percentage of four seconds or higher started to represent ten percent of the users, then this might be problematic.

Network Monitor Summary

The following table summarizes the various detailed metrics that network monitor 16 may calculate in remote and co-located modes:

| Metrics | Co-located Usage | Remote Usage |
| --- | --- | --- |
| TCP Connect Time | Calculate the time from when the SYN packet is sent to the web server until the server replies with a SYN ACK and client sends an ACK to the web server. This time calculation takes network conditions into account. | Calculate the time from when the SYN packet is sent to the web server until the web server replies with a SYN ACK and client sends an ACK to the web server. This time calculation take network conditions into account. |

| Metrics | Co-located Usage | Remote Usage |
| --- | --- | --- |
| Initial Server Response Time (static and dynamic kept independently) | The time from when an initial HTTP Get or Post request is sent by the client until the web server replies with any HTTP reply. This time calculation takes no network conditions into account. | The time from when an initial HTTP Get or Post request is sent by the client until the web server replies with any HTTP reply. This time calculation takes network conditions into account. |
| Remaining HTTP Content Time (Network Transport Time) | The time from when the web server replies to an initial HTTP Get or Post request (above) until it sends all of the rest of the associated dynamic or static HTTP data to the web client. Network delays are taken into account and included in this calculation. | The time from when the web server replies to an initial HTTP Get or Post request (above) until it sends all of the rest of the associated dynamic or static HTTP data to the web client. Network delays are taken into account and included in this calculation. |
| Packet Loss (Dropped Packets) | The number of dropped TCP packets for the HTTP session on packets sent from the web server to the client or vice versa. | The number of dropped TCP packets for the HTTP session on packets sent from the web server to the web client or vice versa. |
| Retransmission Time | The total amount of session time used for TCP packet retransmissions for the HTTP session on packets sent to or form the web server. Retransmission times are kept separately for both. | The total amount of session time used for TCP packet retransmissions for the HTTP session on packets sent to or from the web server. Retransmission times are kept separately for both. |
| Duplicate Data Determination | When monitoring locally to the web server, too much duplicate data being sent from web clients, may mean that the TCP delayed ACK timer is set too passively and needs to be a bit more aggressive. | When monitoring remotely, notifying a network administrator when this situation becomes severe (lots of duplicate data sent from the web server) can be very useful. It may be that the web server's retransmit timer is too aggressive and it needs to be tuned. |
| Network Latency Time | Network Latency is calculated as the round trip time for a packet to travel from the web server to the web client and then back to the web server over the network. | Network Latency is calculated as the round trip time for a packet to travel from the web client to the web server and then back to the web client over the network. |
| HTTP Total Time | The amount of time for the Get or Post request to complete from the time the Get or Post is sent until all data has been sent to the client. | The amount of time for the Get or Post request to complete from the time the Get or Post is sent until all data has been sent to the client. |
| Web server Processing Time | This value really is identical to what is obtained from the "Initial Server Response Time" for HWM. | Time spent on the web server processing in incoming HTTP Get or Post request from the web client. Network Latency and "to web server" retransmission time are subtracted out to calculate this value from a remote monitoring site. |
| HTTP Client Processing Time | Time spent by the web client to process incoming data that it cannot keep up with. This is determined by examining changing values (from zero to non-zero) in the TCP Window field of the TCP header. The client could be either the web browser or a proxy client in the case where we are monitoring locally to the web server. | Time spent by the web client to process incoming data that it cannot keep up with. This is determined by examining changing values (from zero to non-zero) in the TCP Window field of the TCP header. |
| Network Transport Time | The total time taken by the network transport for an HTTP transaction. This time includes, but is not limited to, TCP Slow Start Time, TCP flow control and TCP retransmission time. | The total time taken by the network transport for an HTTP transaction. This time includes, but is not limited to, TCP Slow Start Time, TCP Flow Control and TCP retransmission time. |
| HTTP Data Size (or Average Time) | The amount of HTTP data sent from the Web server to the client as the result of a Get or Post request. | The amount of HTTP data sent from the Web server to the client as the result of a Get or Post request. |
| Hop Count Average | Not used. | Average value of the "Time To Live" field in the IP Header for packets coming from the web server. |

An additional parameter (DNS time) could be used to calculate the time form when an initial DNS request goes out until the reply comes back. This calculation could be implemented by network monitor 16 if desired by simply decoding DNS requests and monitoring the time between a request and an associated response.

Example Network Monitor Architecture

FIG. 9 shows an example architecture for a network monitor 16 provided in the example embodiment. In FIG. 9, a promiscuous mode adapter/card receiver 16a is coupled to network 12 to be monitored. Promiscuous mode adapter/card receiver receives transaction-based protocol requests and responses comprising the data traffic flowing back and forth through network 12 between client 10 and server 14. These received data packets are analyzed by a protocol analyzer 16b which analyzes the various characteristics of the received protocol information in accordance with the features discussed above. A real time clock 16c coupled to receiver 16a and/or protocol analyzer 16b allows a real time stamp to be associated with each piece of protocol being analyzed by protocol analyzer 16b. Analyzer 16b logs the time at which receiver 16a receives various pieces of protocol having the characteristics described above. This logged information may be stored on a data logger 16d. When protocol analyzer 16b determines that a particular transaction or series of transactions has completed, it requests a latency calculator 16e to access the information logged by data logger 16d and calculate, in response thereto, the various latencies described above. These calculated latencies are provided to a reporting arrangement 16e for reporting, e.g., over network 12 to a centralized data facility 20 and/or to other reporting destinations.

Practical Example

The following example illustrates how a remote monitoring system provided by the preferred example embodiment of the invention can be used to advantage.

Suppose, for example, that Terry is the Web Operations Manager for the customer service portal of a major pharmaceutical corporation. He is responsible for the reliability of critical B2B transactions happening online from North America and Europe. Suppose that Tuesday morning at 8 am, Terry receives a voicemail indicating that the London office called the night before informing him that European customers are having trouble getting to their account information because the home page won't load properly. It's been ten hours. Ouch! Terry opens his browser and visits the site. It looks fine.

Like most Web Operations Managers, Terry is dealing with increasingly complex Web systems that are susceptible to performance degradation. They include an array of critical components behind his firewall and many variables outside it that he can't necessarily control. As he sits inside his Chicago data center without a remote monitoring solution in place, Terry lacks the answers to several critical questions. For instance:

1. Why is the site slow?
2. Is it slow in London only or everywhere?
3. Can he do anything about it—is the poor response time due to a general Internet or regional slowdown?

It's the beginning of a long and difficult day. Too bad Terry doesn't have a pair of eyes outside the firewall!

A remote monitor provided in accordance with the present invention could show Terry how his site is performing from an end-user's point of view—and help him determine what's affecting user experience. That's because such a remote monitor can use a global server network to monitor his site's availability, response times and transactions from beyond his data center. Without such a remote monitor, Terry doesn't know how people are experiencing his Web site from an office across the street, much less in London.

Figure 10A:
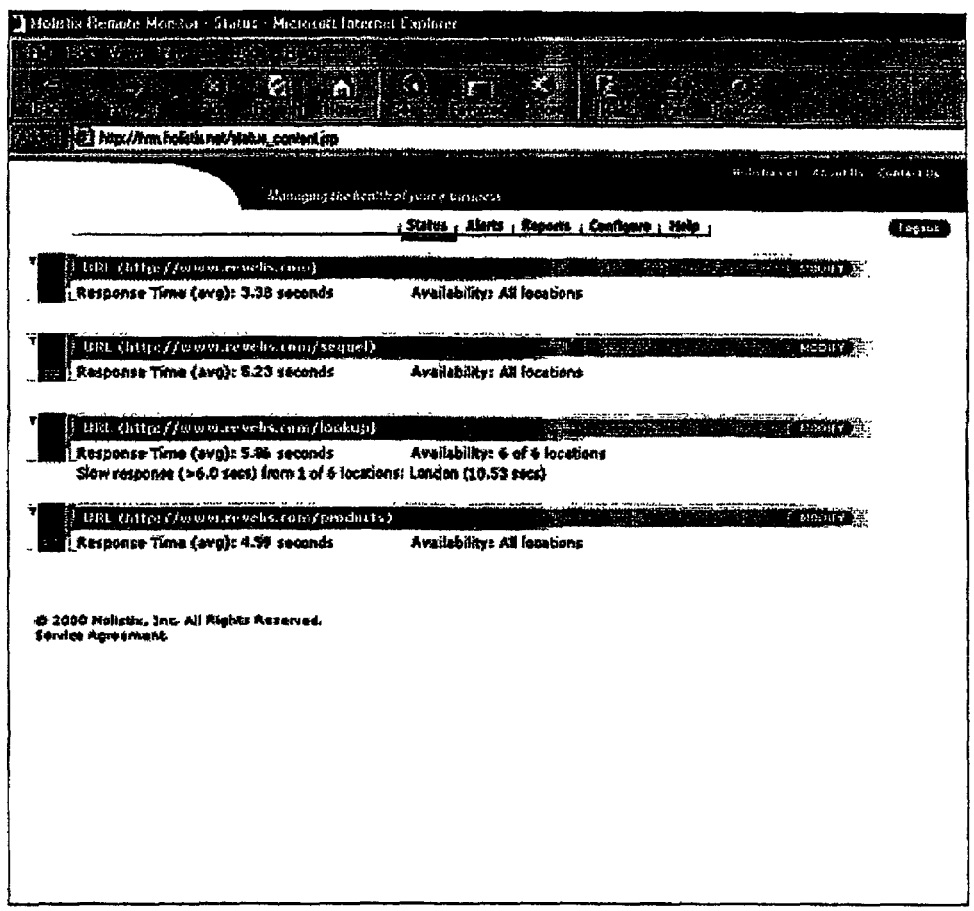
FIGS. 10A-10C show example web page-based reports.
Figure 10B:
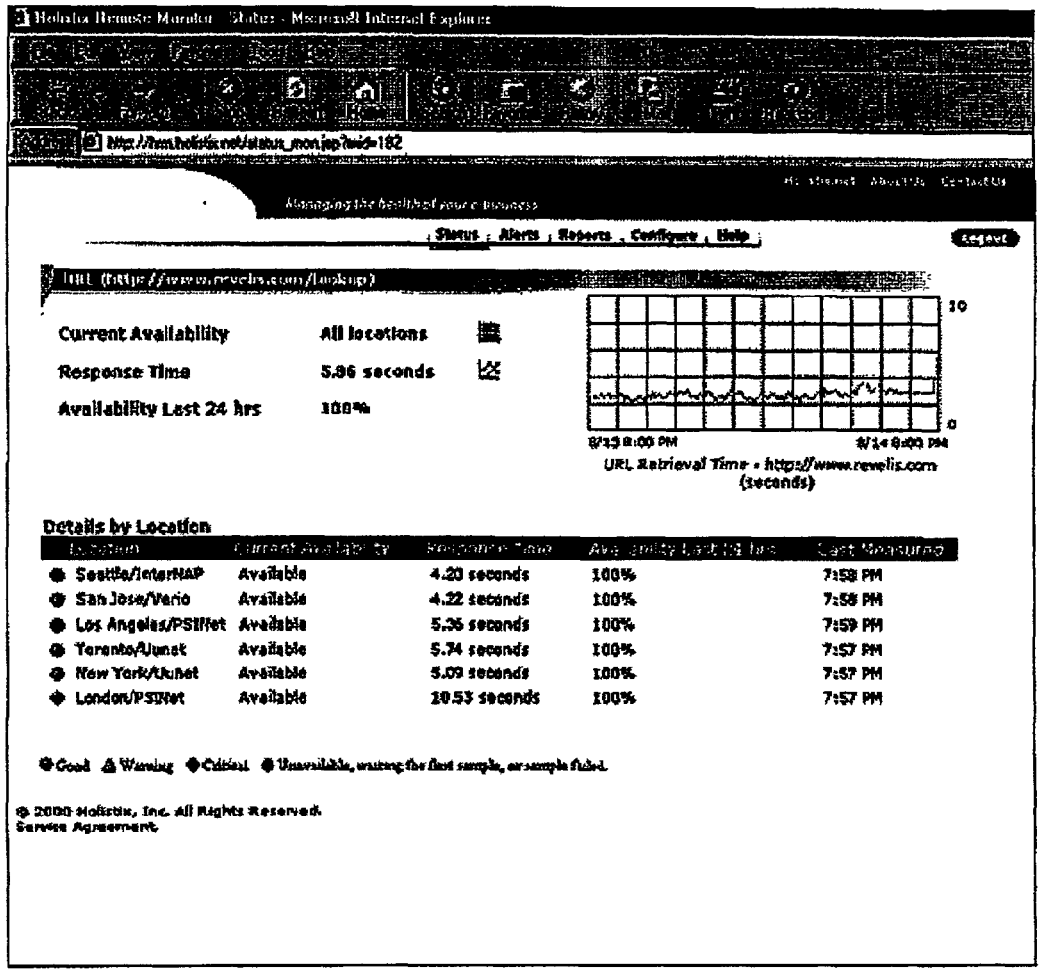
Figure 10C:
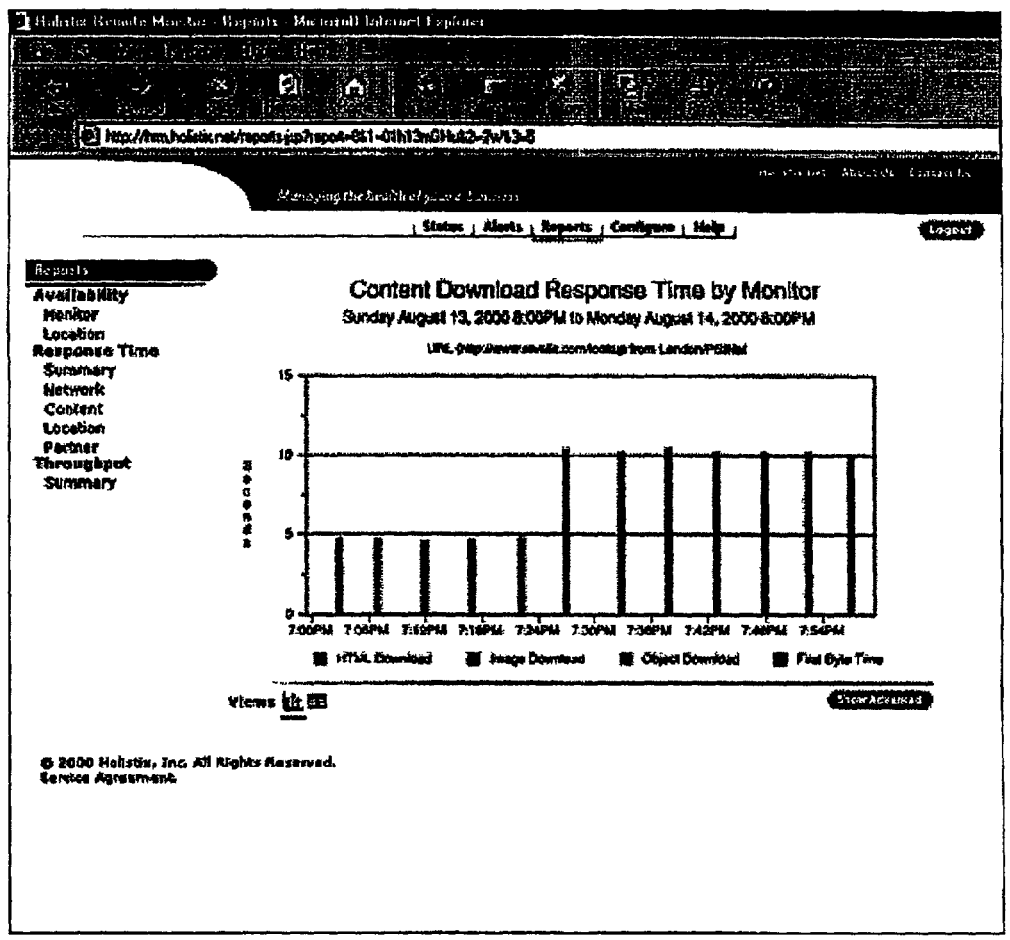

If Terry had the preferred embodiment remote monitoring system in place then on Monday at 8 pm, his pager might have begun to vibrate to tell him that his home page is slow from one monitoring location only: London. Terry could then have accessed the remote monitor on any web-enabled appliance (e.g., even from his home). A status screen (see FIG. 10A) shows him that although the average response time for his home page is under the 6 second threshold he set for it, response time from London is dragging—critically. Calm and collected, Terry clicks for location details and sees (see FIG. 10B) that according to his London monitor, his home page is moving quite slowly. The remote monitor display can display availability and response time for Terry's home page from multiple remote monitoring locations. Availability is fine across the board. But in London, response time is up to a whopping 10.53 seconds. Terry could then click for a report (see FIG. 10C) on the London monitor's Content Download Response Time, and might see that the graphic content of his home page has increased sharply within the last hour. This might, for example, indicate that the Web team must have recently uploaded new content, including an image so big it's impacting performance. Fewer network hops in North America mean that domestic performance is fine, but page loads overseas are way too slow. Terry could then call the Content Manager to get the offending image replaced and solve the problem.

Such a system could have alerted Terry to the slow response time as soon as it occurred, and provide him with the actionable information he needed to:

1. Locate the problem geographically
2. Pinpoint the cause of the slowdown
3. Resolve the problem before his customers encountered any difficulty While the invention has been described in connection with what is presently considered to be the most practical and preferred embodiment, it is to be understood that the invention is not to be limited to the disclosed embodiment. For example, although the preferred embodiments of the invention have been generally described in the context of web servers and web clients communicating over the Internet, the invention is not to be limited to the World Wide Web or to client/server architectures and is not to be limited to the Internet but rather than encompass a variety of other network topologies and arrangements. Similarly, although the preferred embodiment has been described in connection with a particular transaction-based protocol (i.e., HTTP TCP/IP), the invention is not to be limited to this particular protocol but could encompass a variety of other transaction-based or other protocols. Furthermore, although the preferred embodiments have been described in connection with monitoring at a server site and/or remotely from a server site, the invention is not to be so limited, but rather can encompass monitoring with the server, with the client, or somewhere in the middle (e.g., anywhere on a network allowing the two to communicate with one another). Additionally, although certain embodiments herein are described as operating in connection with HTTP GET and/or HTTP POST client request messages, the invention is not limited to these particular requests but may include other requests (e.g., HTTP OPTIONS, BEAD, PUT, DELETE, TRACE CONNECT, other HTTP requests) and in any event is not to be limited to HTTP requests. On the contrary, is intended to cover various modifications and equivalent arrangements included within the scope of the appended claims.

We claim:

1. A method for monitoring the performance of a network including at least one node that communicates with the network using a transaction-based protocol, the method comprising: monitoring characteristics of transaction-based protocol exchanges to and/or from said node; and deriving a plurality of different components including round-trip network latency, TCP connect processing time by calculating a time from when a SYN packet is sent by the node to a server until a time the server replies with a SYN acknowledgment packet, web server processing time by calculating a time from when the node sends an HTTP request until a time the server replies with an initial HTTP reply, and remaining content time by calculating a time after the server replies with the initial HTTP reply until a time when the node receives a final HTTP reply from the server, in response to said monitoring; and wherein said deriving step includes deriving and subtracting delays associated with processing by a further node communicating over the network with said first-mentioned node.

2. The method of claim 1 wherein the monitoring step includes monitoring SYN bit acknowledgment.

3. The method of claim 1 wherein said monitoring step includes monitoring TCP data packet acknowledgment.

4. The method of claim 1 wherein said monitoring step includes monitoring TCP slow start turnaround.

5. The method of claim 1 wherein said monitoring step includes monitoring TCP zero to non-zero window turnaround.

6. The method of claim 1 wherein said monitoring step includes monitoring TCP FIN bit acknowledgment.

7. The method of claim 1 wherein said monitoring and deriving steps are performed at a plurality of network sites remote from said node, or co-located with said node.

8. The method of claim 1 further including reporting said derived results.

9. The method of claim 8 wherein said reporting step comprises generating a web page.

10. The method of claim 8 wherein said reporting step includes providing a web-page-based report over said network.

11. The method of claim 1 wherein said monitoring and deriving steps are performed on a subscription basis.

12. The method of claim 1 wherein said monitoring step includes coupling a monitoring node to said network and operating the monitoring node in a promiscuous mode.

13. A method for subscription-based remote monitoring service, the method comprising: initiating a monitoring subscription over the internet after receiving a subscription payment, including obtaining at least one network address to be monitored; remotely monitoring, over said network, transactions involving said network address; and deriving a plurality of different components including, TCP connect processing time by calculating a time from when a SYN packet is sent by the node to a server until a time the server replies with a SYN acknowledgment packet, web server processing time, remaining content time, network latency and device latency in response to said monitoring; and wherein said deriving step includes deriving and subtracting delays associated with processing by a further node communicating over the network with said first-mentioned node.

14. A method of determining communications protocol latency including: monitoring TCP traffic between a server and a client; and using an initial exchange between said server and said client and TCP header flags to determine whether an initial HTTP reply is retransmitted; and calculating a plurality of different components including round-trip network latency, TCP connect time, TCP connect processing time by calculating a time from when a SYN packet is sent by the node to a server until a time the server replies with a SYN acknowledgment packet, web server processing time and remaining content time; and further including continually calculating transport-to-transport network latency to obtain minimum network latency for at least one TCP session.

15. The method of claim 14 further including using retransmission time as time to discount when calculating web server processing time.

16. The method of claim 14 further including using retransmission time as time to discount when calculating TCP connect processing time.

17. The method of claim 14 further including using round trip network latency as time to discount when calculating web server processing time.

18. The method of claim 14 further including using round-trip network latency as time to discount when calculating TCP connect processing time.

19. A method for monitoring the performance of a wireless network including at least one node that communicates with the wireless network using a transaction-based protocol, the method comprising: monitoring particular characteristics of wireless transaction-based protocol exchanges to and/or from said node; and deriving a plurality of components including round-trip network latency, TCP connect processing time by calculating a time from when a SYN packet is sent by the node to a server until a time the server replies with a SYN acknowledgment packet, web server processing time, remaining content time, and round-trip network latency in response to said monitoring; and wherein said monitoring step includes: continually calculating network retransmission time and computing web server processing time and TCP connect time and the number of packets lost, said computing taking into account said calculated network retransmission time.

20. The method of claim 19 wherein said monitoring step includes: receiving requests and responses from at least one node located remotely from said receiver on the network; isolating features of received requests and responses and logging times associated with each; and calculating, in response to said logging, latency associated with said network and latency associated with said node.

21. The method of claim 19 wherein said monitoring step includes: monitoring HTTP traffic flowing between a web server and a web client over the wireless network; and using the web server's initial HTTP reply packet as the logical dividing line for the web client to web server HTTP packet exchange, wherein said logical dividing line is used to distinguish initial web server processing time from wireless network transport time.

22. The method of claim 19 wherein said monitoring step includes using an IP Header sequence number to help distinguish out-of-order TCP packets from retransmitted TCP data packets each carrying HTTP data.

23. The method of claim 19 wherein said monitoring step includes using an initial exchange between said server and said client and TCP header flags to determine whether an initial HTTP reply is retransmitted.

24. The method of claim 19 further including using an HTTP initial request and reply to determine if the content of at least one web page hosted by the web server static or dynamic.

25. The method of claim 19 further including discounting at least one retransmitted HTTP Get or HTTP' Post request from said client as web server processing time.

26. A non-transitory computer-readable medium that stores instructions that when executed by a computer cause the computer to perform a method, the method comprising:
monitoring characteristics of transaction-based protocol exchanges to and/or from a node in a network; and
deriving a plurality of different components including round-trip network latency, TCP connect processing time by calculating a time from when a SYN packet is sent by the node to a server until a time the server replies with a SYN acknowledgment packet, web server processing time by calculating a time from when the node sends an HTTP request until a time the server replies with an initial HTTP reply, and remaining content time by calculating a time after the server replies with the initial HTTP reply until a time when the node receives a final HTTP reply from the server, in response to said monitoring;

wherein said deriving step includes deriving and subtracting delays associated with processing by a further node communicating over the network with said node.

27. A non-transitory computer-readable medium that stores instructions that when executed by a computer cause the computer to perform a method, the method comprising:

monitoring characteristics of transaction-based protocol exchanges to and/or from a node in a network; and deriving a plurality of different components including round-trip network latency, network connect processing time by calculating a time from when a first acknowledgment packet is sent by the node to a server until a time the server replies with a server acknowledgment packet, web server processing time by calculating a time from when the node sends a request until a time the server replies with an initial reply, and remaining content time by calculating a time after the server replies with the initial reply until a time when the node receives a final reply from the server, in response to said monitoring;

wherein said deriving step includes deriving and subtracting delays associated with processing by a further node communicating over the network with said node.

28. A non-transitory computer-readable medium that stores instructions that when executed by a computer cause the computer to perform a method, the method comprising:

initiating a monitoring subscription over the Internet after receiving a subscription payment, including obtaining at least one network address to be monitored;

remotely monitoring, over said network, transactions involving said network address; and deriving a plurality of different components including, TCP connect processing time by calculating a time from when a SYN packet is sent by a first node to a server until a time the server replies with a SYN acknowledgment packet, web server processing time, remaining content time, network latency and device latency in response to said monitoring;

wherein said deriving step includes deriving and subtracting delays associated with processing by a further node communicating over the network with said first node.

29. A system, comprising:

at least one processor for processing instructions;

a network interface for communicating with a network and being operatively connected to the at least one processor;

a non-transitory computer-readable medium that stores instructions that when executed by the at least one processor cause the system to perform a method, the method comprising:

monitoring characteristics of transaction-based protocol exchanges to and/or from a node in the network; and deriving a plurality of different components including round-trip network latency, network connect processing time by calculating a time from when a first acknowledgment packet is sent by the node to a server until a time the server replies with a server acknowledgment packet, a server processing time by calculating a time from when the node sends a request until a time the server replies with an initial reply, and remaining content time by calculating a time after the server replies with the initial reply until a time when the node receives a final reply from the server, in response to said monitoring;

wherein said deriving step includes deriving and subtracting delays associated with processing by a further node communicating over the network with said node.

* * * * *

UNITED STATES PATENT AND TRADEMARK OFFICE
CERTIFICATE OF CORRECTION

| | | |
|---|---|---|
| PATENT NO. | : 7,937,470 B2 | |
| APPLICATION NO. | : 09/740804 | |
| DATED | : May 3, 2011 | |
| INVENTOR(S) | : Curley et al. | |

It is certified that error appears in the above-identified patent and that said Letters Patent is hereby corrected as shown below:

On Title page 2, Item (56), in column 2, under "Other Publications", line 6, delete "appliant" and insert -- applicant --, therefor.

On Title page 2, Item (56), in column 2, under "Other Publications", line 14, delete "Appliant" and insert -- Applicant --, therefor.

On Title page 2, Item (56), in column 2, under "Other Publications", line 14, delete "appliant" and insert -- applicant --, therefor.

In column 4, line 56, after "time" insert -- . --.

In column 5, line 22, after "time" insert -- . --.

In column 8, line 66, after "solutions" insert -- . --.

In column 10, line 36, after "time" insert -- . --.

In column 11, line 58, delete "Protocol/internet" and insert -- Protocol/Internet --, therefor.

In column 15, line 7, delete "eacy" and insert -- easy --, therefor.

In column 15, line 25, delete "But," and insert -- But --, therefor.

In column 21, line 42, delete "retransmitted" and insert -- Retransmitted --, therefor.

In column 25, line 46, delete "it-is" and insert -- it-or is --, therefor.

In column 26, line 24, after "difficulty" insert -- . --.

Signed and Sealed this
Fourth Day of October, 2011

David J. Kappos
*Director of the United States Patent and Trademark Office*

In column 26, line 50, delete "BEAD," and insert -- HEAD, --, therefor.

In column 28, line 20, in Claim 19, delete "time and" and insert -- time; and --, therefor.

In column 28, line 49, in Claim 24, after "server" insert -- is --.

In column 28, line 52, in Claim 25, delete "HTTP'" and insert -- HTTP --, therefor.